(12) United States Patent
Lofink, Jr. et al.

(10) Patent No.: US 7,438,019 B2
(45) Date of Patent: Oct. 21, 2008

(54) INTEGRATED PNEUMATIC ACTUATOR AND PUMP FOR DISPENSING CONTROLLED AMOUNTS OF A FLUID

(75) Inventors: Robert William Lofink, Jr., Pickens, SC (US); Frederic Paul Granson, Mooresville, NC (US); Gordon Douglas James, Mountain Rest, SC (US); Robert L. Ilich, Wake Forest, NC (US)

(73) Assignees: Compact Automation Products, LLC, Westminster, SC (US); Embrex, Inc., Durham, NC (US)

( * ) Notice: Subject to any disclaimer, the term of this patent is extended or adjusted under 35 U.S.C. 154(b) by 72 days.

(21) Appl. No.: 11/289,759

(22) Filed: Nov. 29, 2005

(65) Prior Publication Data

US 2006/0144252 A1    Jul. 6, 2006

Related U.S. Application Data

(60) Provisional application No. 60/631,389, filed on Nov. 29, 2004, provisional application No. 60/687,669, filed on Jun. 6, 2005.

(51) Int. Cl.
*A01K 45/00* (2006.01)
(52) U.S. Cl. ....................................... 119/6.8
(58) Field of Classification Search ............... 119/6.8
See application file for complete search history.

(56) References Cited

U.S. PATENT DOCUMENTS

| | | | |
|---|---|---|---|
| 4,458,630 A | 7/1984 | Sharma et al. | |
| 4,561,856 A * | 12/1985 | Cochran | 604/143 |
| 4,681,063 A | 7/1987 | Hebrank | |
| 4,969,874 A * | 11/1990 | Michel et al. | 604/140 |
| 5,028,421 A | 7/1991 | Fredericksen et al. | |
| 5,056,464 A * | 10/1991 | Lewis | 119/6.8 |
| 5,176,101 A | 1/1993 | Paul et al. | |
| 5,339,766 A | 8/1994 | Phelps et al. | |
| 5,438,954 A | 8/1995 | Phelps et al. | |
| 5,817,320 A * | 10/1998 | Stone | 424/278.1 |
| 5,900,929 A | 5/1999 | Hebrank et al. | |
| 6,240,877 B1 * | 6/2001 | Bounds | 119/6.8 |
| 6,244,214 B1 * | 6/2001 | Hebrank | 119/6.8 |
| 6,286,455 B1 | 9/2001 | Williams | |
| 6,499,428 B1 | 12/2002 | Prindle | |
| 6,506,385 B1 | 1/2003 | Poston et al. | |
| 6,668,753 B2 | 12/2003 | Hebrank | |
| 7,041,439 B2 * | 5/2006 | Phelps et al. | 435/4 |
| 7,096,820 B2 * | 8/2006 | Correa et al. | 119/6.8 |
| 2005/0132964 A1 * | 6/2005 | Breuil et al. | 119/6.8 |

OTHER PUBLICATIONS

Search Report in PCT/US05/43075 mailed Aug. 1, 2007.

* cited by examiner

*Primary Examiner*—Son T. Nguyen
(74) *Attorney, Agent, or Firm*—Dority & Manning, P.A.

(57) ABSTRACT

The present subject matter relates to methods and apparatus for metering and dispensing selected materials. Selected materials may correspond to liquids, suspensions, emulsions and solids, and in selected embodiments may correspond to treatment compositions directed to the treatment of poultry eggs. Certain embodiments provide selective dispensing of selected metered material upon detection of the presence of an object to be treated.

26 Claims, 21 Drawing Sheets

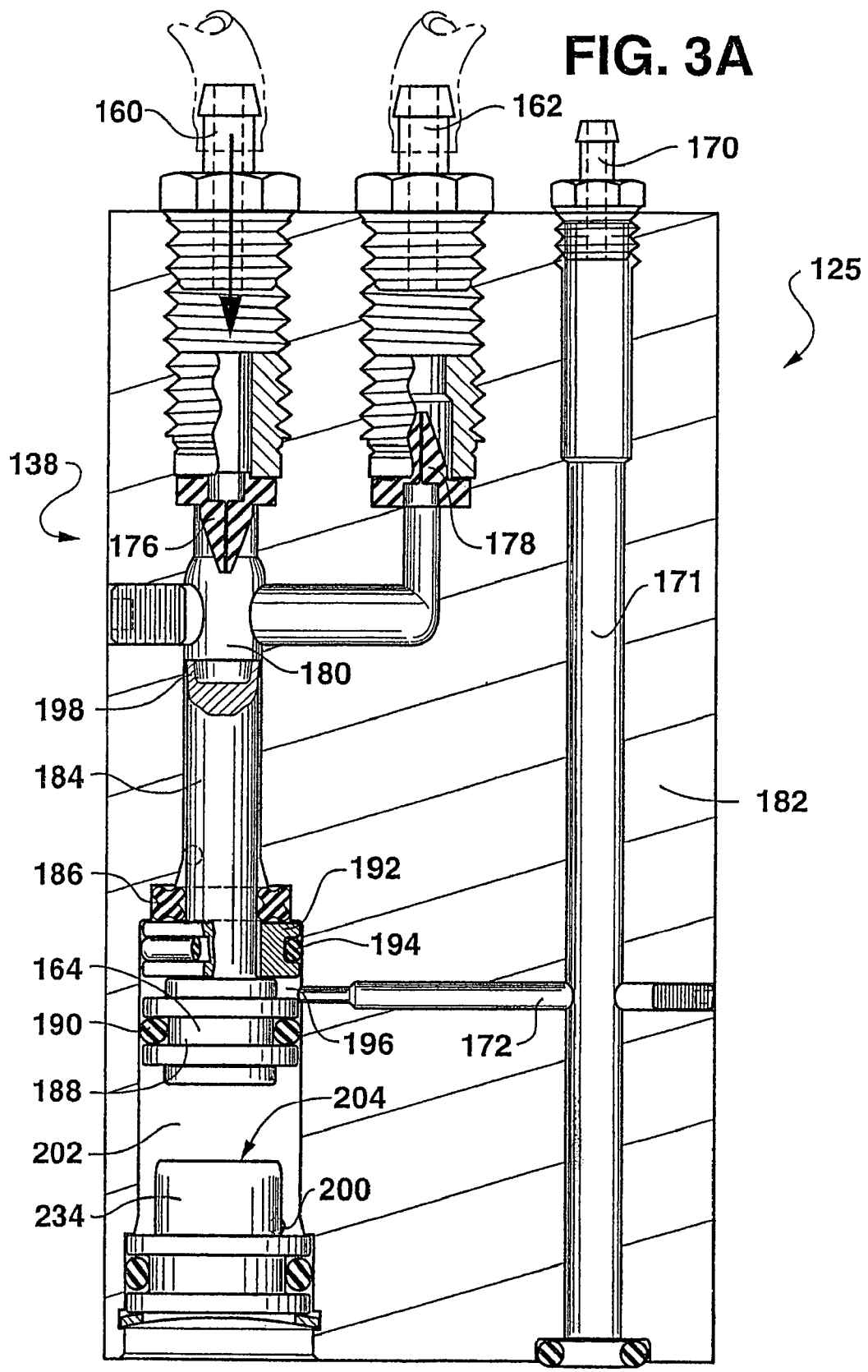

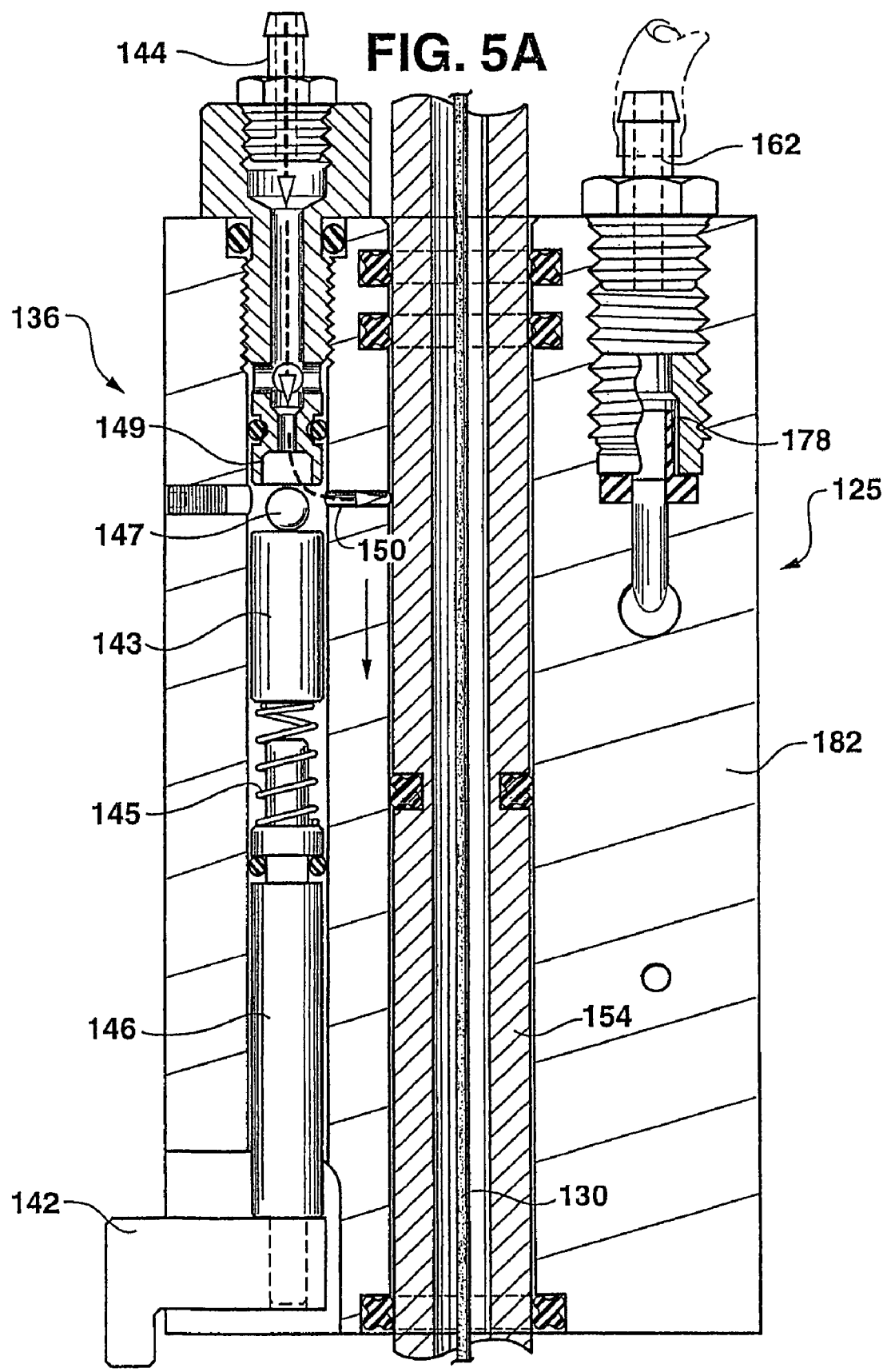

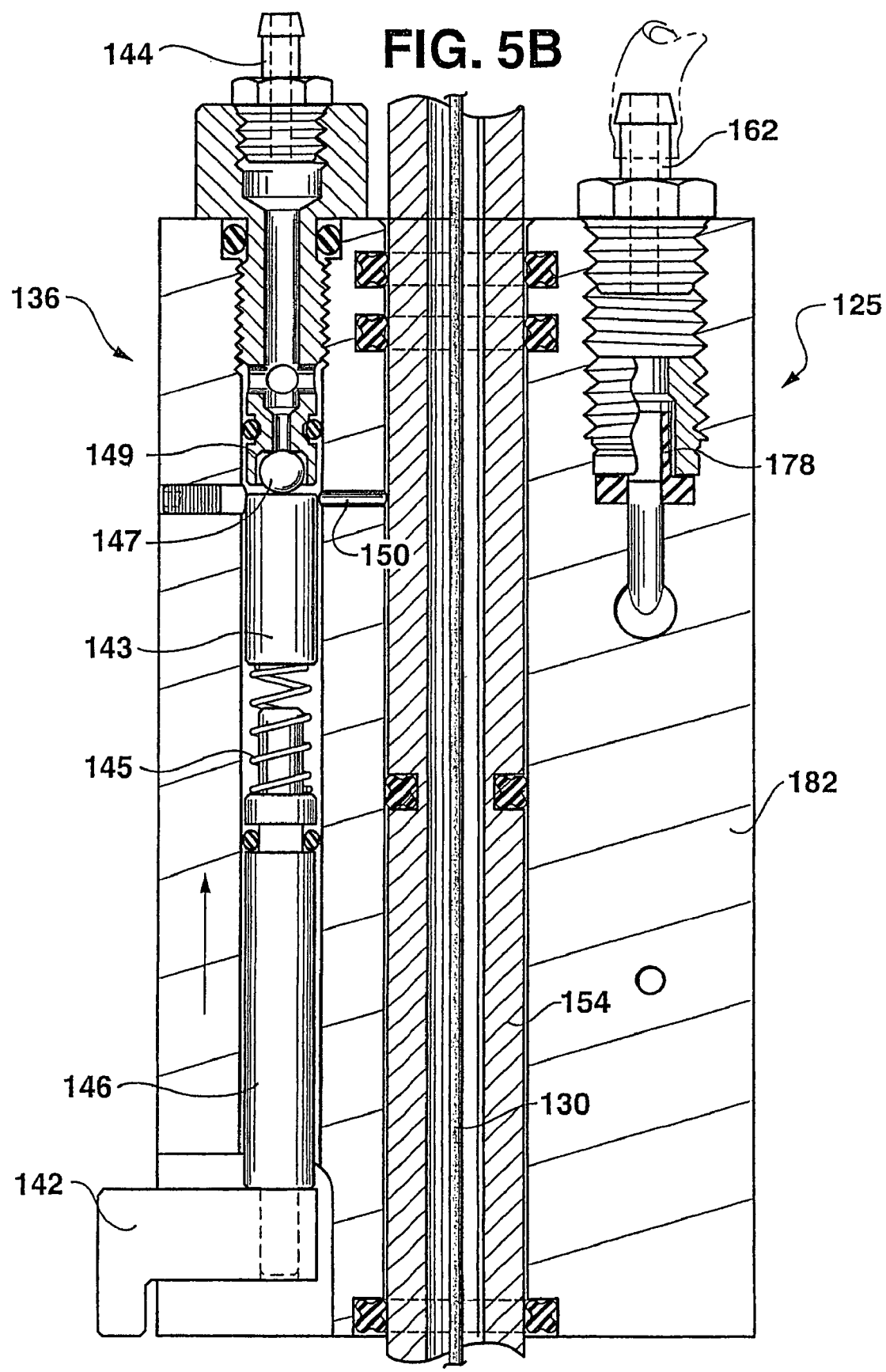

INTEGRATED PNEUMATIC ACTUATOR AND PUMP FOR DISPENSING CONTROLLED AMOUNTS OF A FLUID

CROSS REFERENCE TO RELATED APPLICATIONS

This application claims priority to U.S. Provisional Patent Application 60/631,389, filed Nov. 29, 2004, entitled "INTEGRATED PNEUMATIC ACTUATOR AND PUMP FOR DISPENSING CONTROLLED AMOUNTS OF A FLUID" and to U.S. Provisional Patent Application 60/687,669, filed Jun. 6, 2005, entitled "INTEGRATED PNEUMATIC ACTUATOR AND PUMP FOR DISPENSING CONTROLLED AMOUNTS OF A FLUID."

FIELD OF THE INVENTION

The present subject matter relates to fluid delivery. More particularly, the present subject matter relates to the controlled injection of various compositions into eggs.

BACKGROUND OF THE INVENTION

In various and sundry processes, an apparatus may be needed to dispense carefully controlled amounts of a composition as various products are being formed or as various processes are taking place. Such dispensing devices may be needed, for instance, during the production of pharmaceuticals, chemical products, semiconductor products including integrated circuits, food products, and the like. In some applications, a dispenser is needed that is capable of accurately and reliably dispensing relatively small amounts of a fluid at periodic intervals.

For example, in one particular embodiment, dispensing devices as described above are used in order to inject a composition into a fertilized egg, such as a poultry egg. In the past, eggs have been injected with vaccines, vitamins, nutrients, and antibiotics. The compositions that are injected into the egg have been employed in order to decrease post-hatch mortality rates and/or to increase the potential growth rates of the resulting poultry. Antigens have also been injected into live eggs in order to incubate various substances used in vaccines which have human or animal applications.

In the past, in ovo injections of substances into poultry eggs have occurred by piercing the eggshell to create a hole and then extending an injection needle through the hole and into the interior of the egg. The needle, for instance, may be injected into the embryonic fluid contained in the egg. Examples of injection devices and/or egg treatment methods are disclosed in U.S. Pat. Nos. 4,458,630; 4,681,063; 5,028,421; 5,176,101; 5,339,766; 5,438,954; 5,900,929; 6,286,455; 6,506,385; and 6,668,753 which are all incorporated herein by reference.

In prior systems, eggs were conveyed down a conveyor on a tray at relatively high speeds. For example, the eggs may be conveyed at a rate of about 20,000 eggs per hour. At a certain point in the process, motion of the eggs is halted while the eggs are injected with a treatment composition. In many applications, a plurality of injection devices are brought down upon the eggs simultaneously. The injection devices are configured to release a treatment composition through the needle whether or not an egg is present below the needle. The excess fluid is then channeled off the conveyor and discarded. As can be appreciated, this technique creates a significant amount of waste of the treatment composition which, in many applications, is relatively expensive. In addition, problems have also been experienced in dispensing controlled amounts of the treatment composition. In particular, prior art dispensing devices have not only been somewhat cumbersome but have also not been capable of uniformly and repeatedly dispensing controlled amounts of the treatment composition with the desired accuracy.

In view of the above, a need exists for an injection system that includes controls configured to sense the presence of an egg for only releasing a treatment composition when an egg is present. A need also exists for an injection system capable of dispensing precise and controlled amounts of a treatment composition at periodic intervals.

In addition, a need also generally exists for a dispensing device for use in other industries that is capable of repeatedly dispensing uniform and precise amounts of a chemical composition during a manufacturing process. In addition to being well suited for use in ovo injection systems, such a device is also well suited for use in the pharmaceutical industry, the semiconductor industry, the food processing industry, the chemical manufacturing industry, and the like. In the above fields, for example, a need currently exists for a compact dispensing device for dispensing relatively small amounts of a composition that is capable of attaining the above described goals.

SUMMARY OF THE INVENTION

In view of the recognized features encountered in the prior art and addressed by the present subject matter, improved devices, systems and methodologies for egg processing have been developed. In general, the present disclosure is directed to a dispensing device capable of repeatedly dispensing precise amounts of a fluid composition.

In accordance with aspects of certain embodiments of the present technology, precisely controllable amounts of various compositions may be injected into a receiving medium. In accordance with other aspects of the present technology, sample quantities of fluid may be extracted from a fluid containing medium.

In accordance with more particular aspects of certain embodiments of the present technology, an integrated pumping and delivery apparatus has been provided that is capable of repeatedly delivering to and/or extracting from a container small quantities of various fluids.

Another aspect of yet further embodiments of the present technology relates to the incorporation of object detection capability so that dispensing and/or attempted extraction of fluids may be avoided in the instance of absence of an expected container.

Yet further aspects of certain embodiments of the present technology relate to depositing or extracting controlled amounts of compositions during varied manufacturing processes including, but not limited to, semiconductor manufacturing and food preparation.

Additional aspects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3A is a cross-sectional view along line 3A-3A of FIG. 2;

FIG. 5A is a cross-sectional view along line 5-5 of FIG. 2 that shows the egg sensing device in an activated position;

FIG. 5B is a cross-section view along line 5-5 of FIG. 2 that shows the egg sensing device in a deactivated position;

Figure 1:
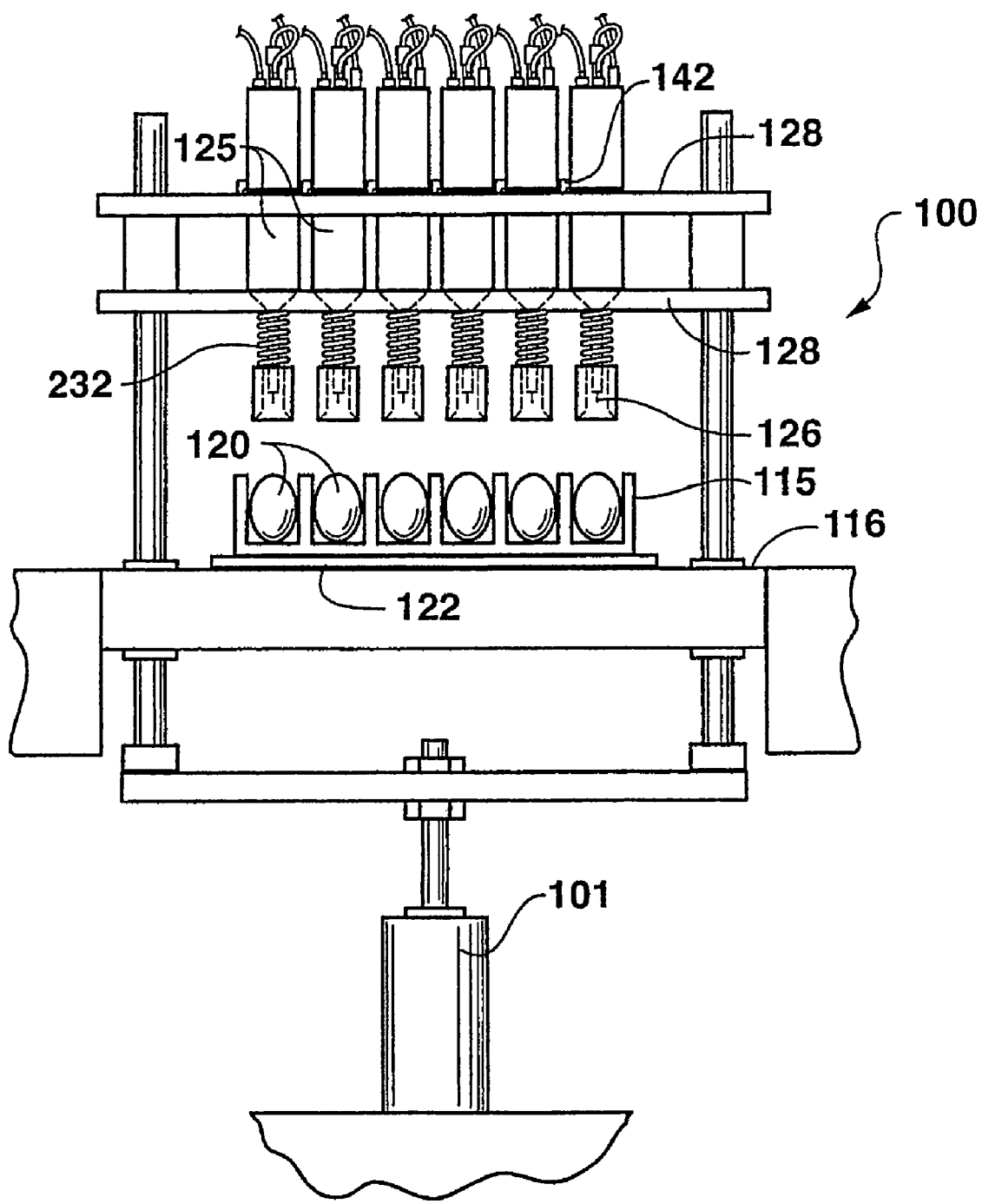
FIG. 1 is a side view intended to generally illustrate a plurality of eggs being conveyed on a conveyor and an ovo injection system positioned above the eggs.

Repeated use of reference characters in the present specification and drawings is intended to represent the same or analogous features or elements of the present invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention.

As noted in the Summary OF The Invention above, the present disclosure is directed to a dispensing device capable of repeatedly dispensing precise amounts of a fluid composition. The device is particularly well suited to dispensing or extracting relatively small amounts of a fluid, such as delivering fluid in amounts less than about 200 microliters, such as less than about 100 microliters. For instance, in particular applications, the dispensing device is well suited to dispensing amounts of from about 1 microliter to about 500 microliters, such as from about 1 microliter to about 100 microliters and, in one particular embodiment, in amounts from about 25 microliters to about 75 microliters. As stated above, in addition to dispensing small amounts of a fluid, the dispensing device can also extract small amounts of fluid if desired. The amounts extracted may be different or the same from the amounts described above.

As used herein, the device will be referred to a "dispensing device". It should be understood, however, that by reversing the operation of the device, the device can extract amounts as will be apparent to one skilled in the art.

Of particular advantage, the dispensing device is relatively compact and, in one embodiment, may comprise a device that includes an integrated pumping apparatus and delivery apparatus. The dispensing device may also be air actuated which also provides various advantages and benefits in various applications.

The dispensing device may further include a locating apparatus that determines whether or not a particular object or target is present prior to dispensing or extracting any of the fluid composition.

The dispensing device of the present invention may be used in numerous applications. For instance, the dispensing device is well suited to dispensing or extracting chemical compositions during the production of pharmaceuticals or during the production of chemical products. The dispensing device is also well suited to depositing or extracting controlled amounts of compositions during the production of semiconductor devices. In still another application, the dispensing device may be used to dispense or extract controlled amounts of ingredients during food preparation processes.

In one particular embodiment, the dispensing device has been found to be well suited to being incorporated into an injection system for injecting a treatment composition into a fertilized egg, such as a poultry egg. For exemplary purposes only, the following description will describe use of the dispensing device in an egg injection system. It should be understood, however, that the dispensing device may be used in other numerous applications without limitation.

When a dispensing device is used to inject a treatment composition into poultry eggs, the treatment composition can be any suitable composition that provides benefits to the developing embryo. For instance, the treatment composition may comprise a vaccine, a vitamin formulation, a growth enhancing agent, an antibiotic, and the like including mixtures thereof. The treatment composition may comprise a liquid, a suspension, an emulsion, or even a solid.

When the dispensing device of the present invention is incorporated into an egg injection device, the egg injection system may include a plurality of the egg injection devices. Each device may include an egg sensing system that is configured to determine whether or not an egg is in contact with the device. If an egg is sensed, the egg sensing system allows a syringe to be inserted into the egg for dispensing a treatment composition. If an egg is not sensed, however, then no treatment composition is dispensed.

In one embodiment, each egg injection device may further include a metering or pumping device that dispenses controlled amounts of the treatment composition through the syringe when the presence of an egg has been sensed. Although the metering device may be remotely located, in one embodiment, the metering device is built directly into the egg injection device.

Referring to FIG. 1, one exemplary embodiment of an egg injection system generally 100 is illustrated. As shown, a plurality of eggs 120 are conveyed by a conveyor 122 that is supported by a frame 116. In one embodiment, the eggs 120 may be maintained in a flat 115 as the eggs are conveyed on the conveyor 122. The eggs 120 may be at any suitable stage of development depending upon the treatment composition that is being injected into the eggs. In one particular embodiment, for instance, the eggs 120 may be within about 48 hours to about 24 hours of hatching. In this embodiment, a vaccine, antibody and/or vitamin composition may be injected into the eggs. In certain systems, the eggs may be moved at a relatively high rate. For example, the conveyor 122 may be configured to convey the eggs at a rate of at least about 25,000 eggs per hour, such as from about 60,000 eggs per hour to about 70,000 eggs per hour.

As shown in FIG. 1, at one location on the frame 116, a plurality of egg injection devices 125 are positioned over the eggs 120. The egg injection devices 125 each include an egg locator head 126. The egg injection devices 125 are shown in association with a stationary plate 128. The egg injection devices 125 are capable of moving towards and away from the eggs 120 with the use of any suitable mechanism or motor. In this regard, actuator 101 may move plates 128 along with the egg locator heads 126 towards and away from the eggs 120. Springs 232 allow for movement of the egg locator head 126 upwards when placed into contact with egg 120 so as to achieve a desired positioning between these components.

The stationary plate 128 is configured to releasably hold each of the egg injection devices 125 in position at selected times during the process. In this regard, the stationary plate 128 may include any suitable clamping device capable of holding the egg injection devices 125 and releasing the devices at predetermined times. For example, in one embodiment, the stationary plate 128 may include a plurality of air bladders that are periodically inflated in order to hold the egg injection devices 125 in position. It should be understood, however, that any suitable clamping device may be used.

As shown, the eggs 120 are held in the flat 115 in a substantially upright position. The flat 115 is configured to provide external access to predetermined areas of the eggs 120. Each egg 120 is held by the flat 115 so that a respective end thereof is in proper alignment relative to a corresponding one of the egg injection devices 125 as the egg locator head 126 advances towards the flat 115.

Each egg injection device 125 generally includes a fluid delivery device such as one or more lumen or needle. As used herein, a "lumen" is a cavity or inner open space of a tube such as a needle. A lumen for delivery of a treatment composition may be within a needle, or between a needle and an outer guide or punch. Multiple lumens may be formed within a single needle, and the outlet ports may be positioned at different locations on a needle. In one particular embodiment, as shown in FIGS. 12B and 12C, each egg injection device 125 may include a treatment composition needle 130 positioned within a punch needle 132. The punch needle 132 is for forming an opening within the eggs 120. The treatment composition needle 130, on the other hand, is for injecting a treatment composition into the egg 120.

As stated above, the egg injection devices 125 are movable towards the eggs 120. In particular, the egg injection devices 125 may include a retracted position as shown in FIG. 1 and an extended position. In the extended position, as shown in FIGS. 12B and 12C, the egg locator head 126 is configured to contact and rest against predetermined areas of an external eggshell. In this position, a treatment composition is injected into the eggs 120. When not injecting a treatment composition, however, the injection heads 125 are retracted to rest a predetermined distance above the eggs 120. In an alternative embodiment, the conveyor 122 and eggs 120 may be configured so as to move towards and away from the egg injection devices 125.

Referring now to FIGS. 2 through 12, one embodiment of an egg injection device 125 made in accordance with the present invention is shown. In FIGS. 2 through 12, the egg injection device 125 is in various cross sectional views to identify the different internal components of the device.

Figure 11:
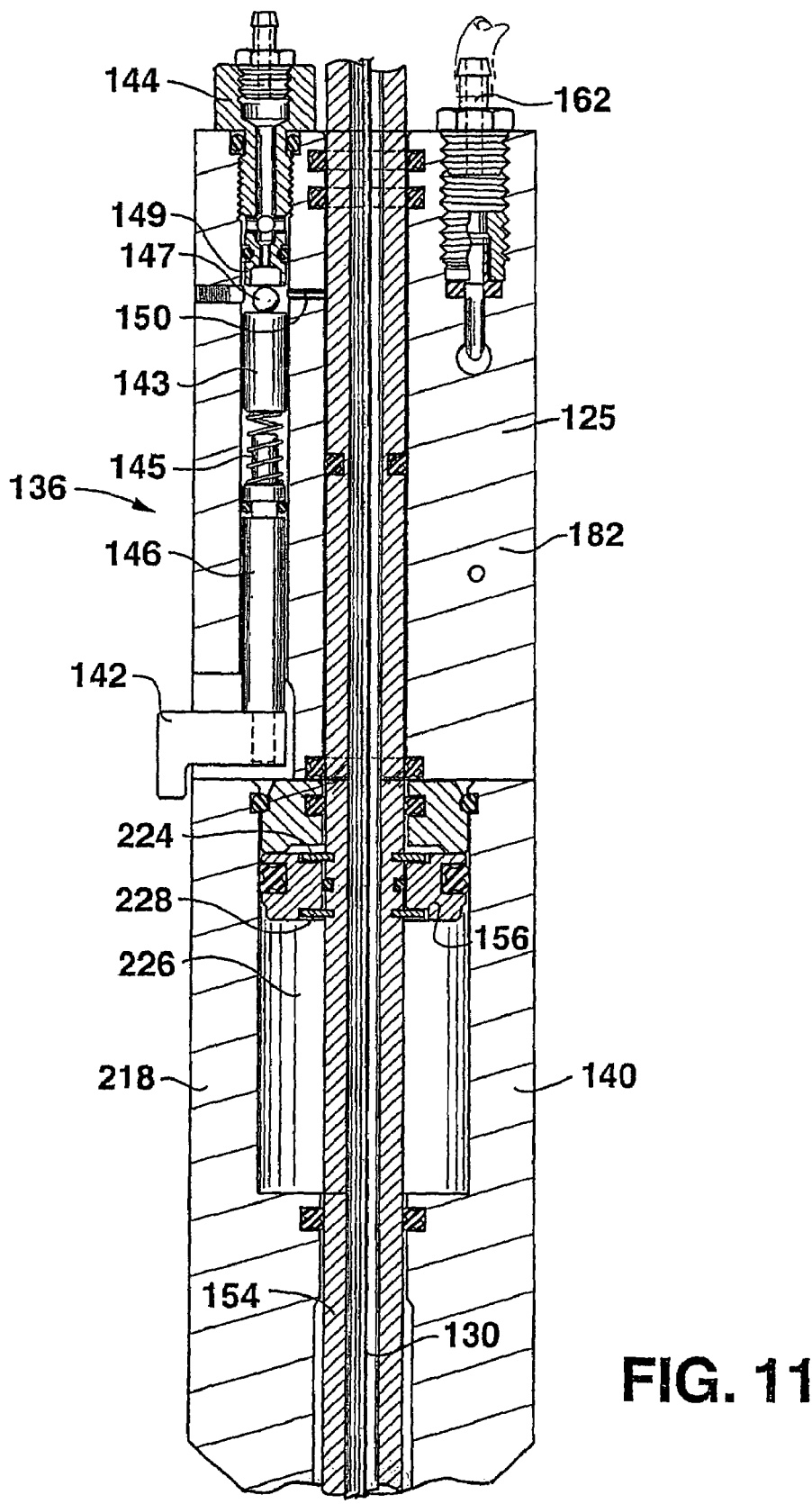
FIG. 11 is cross-sectional view of a portion of the egg injection device that shows the positional relationship between two blocks of the egg injection device and related components.
Figure 12A:
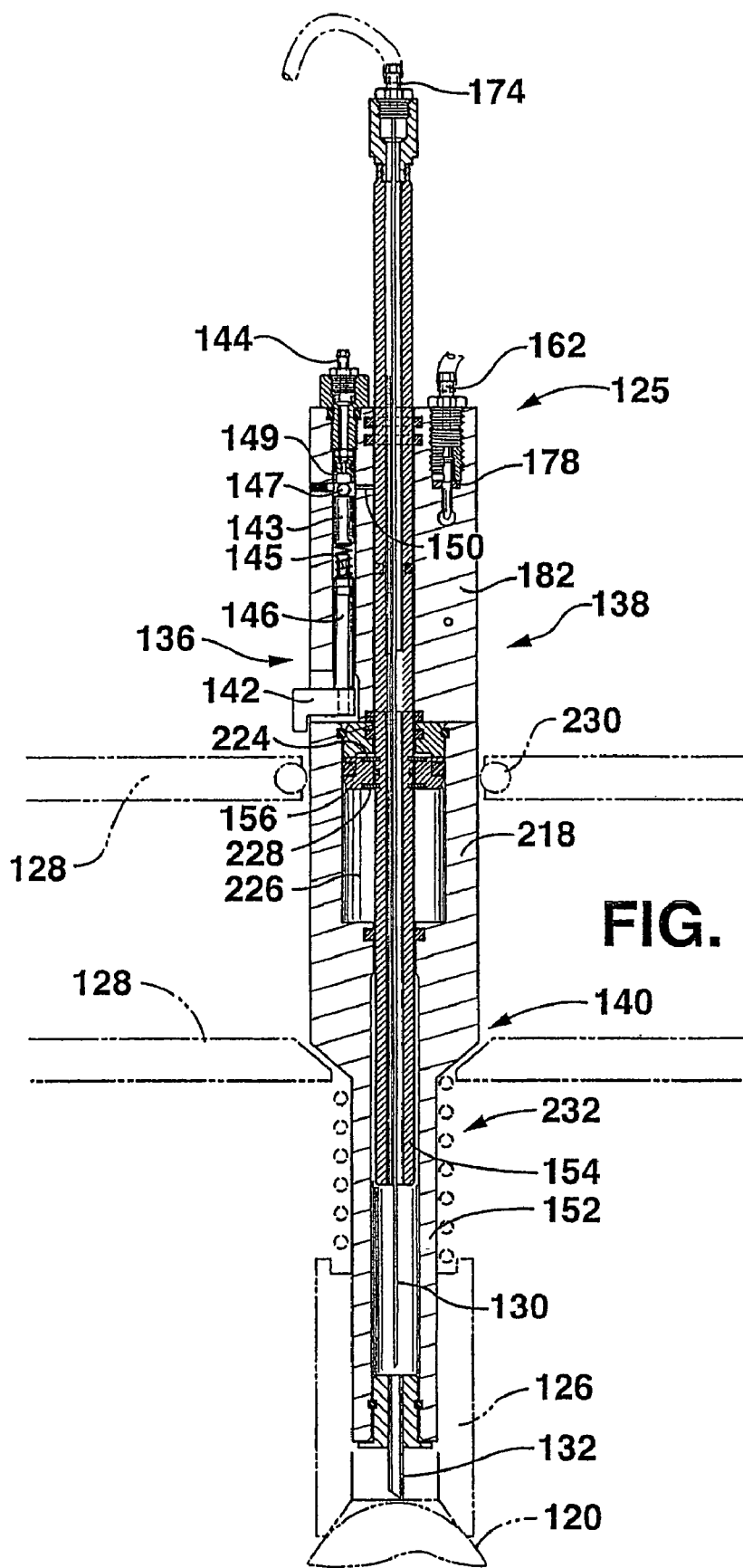
FIG. 12A is a cross-sectional view of the egg injection device that shows the positional relationship between the egg injection device, stationary plates, inflatable tubes and egg.
Figure 12B:
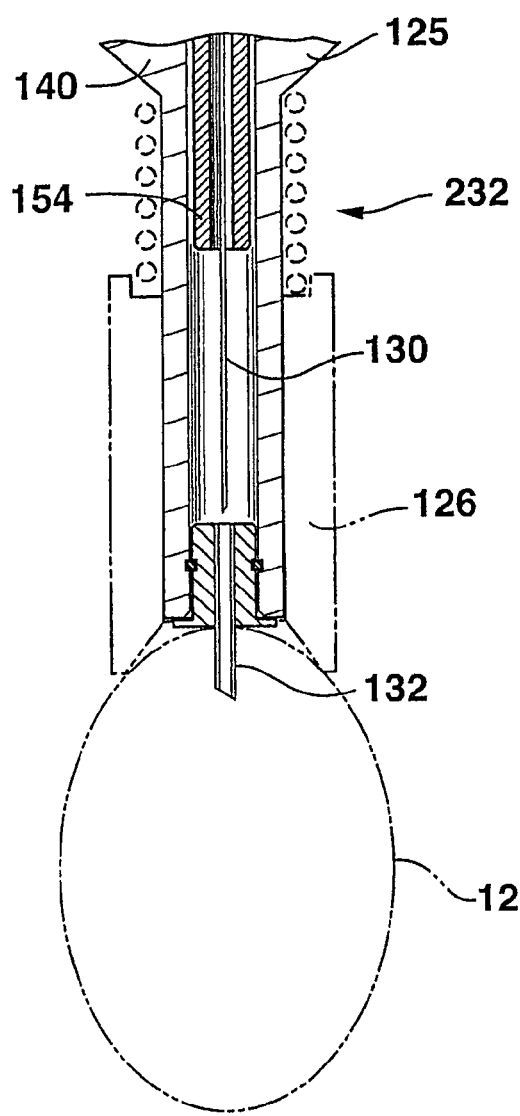
FIG. 12B is cross-sectional view of a portion of the egg injection device that shows a punch needle inserted into the egg.
Figure 12C:
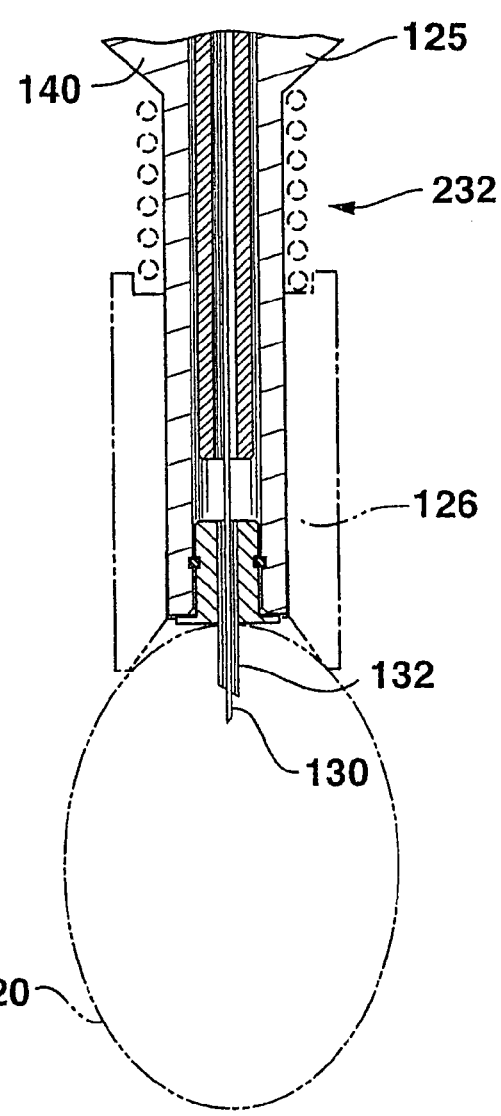
FIG. 12C is cross-sectional view of a portion of the egg injection device that shows a treatment composition needle inserted into the egg.

In general, the egg injection device 125 includes an egg sensing device 136 as shown in FIG. 11, a composition dispensing device 138 as shown in FIG. 12A, and an extendable syringe 140 as particularly shown in FIGS. 12A-12C. The extendable syringe 140 includes the treatment composition needle 130 and the punch needle 132 as shown in FIGS. 12A-12C. In addition to the above, the egg injection device 125 may also be placed in association with a dispensing device for a sanitizing fluid that sanitizes the device after each application of a treatment composition to an egg 120.

The operation and process for using the egg injection system 100 as shown in FIG. 1 will now be discussed in greater detail. As shown in FIG. 1, the eggs 120 are conveyed below a plurality of the egg injection devices 125. In one particular embodiment, for instance, the egg injection system 100 may include from about 60 to about 100 egg injection devices 125 positioned in a square or rectangular pattern. As illustrated in FIG. 1, the eggs 120 are conveyed below the egg injection devices 125. The egg injection devices 125 are then lowered by the actuator 101 such that the egg locator heads 126 contact the corresponding eggs 120. If the egg locator head 126 contacts an egg 120, movement of the egg injection device 125 stops. If an egg 120 is not present on the flat 115, however, the egg injection device 125 moves farther downwardly towards the conveyor 122.

Figure 2:
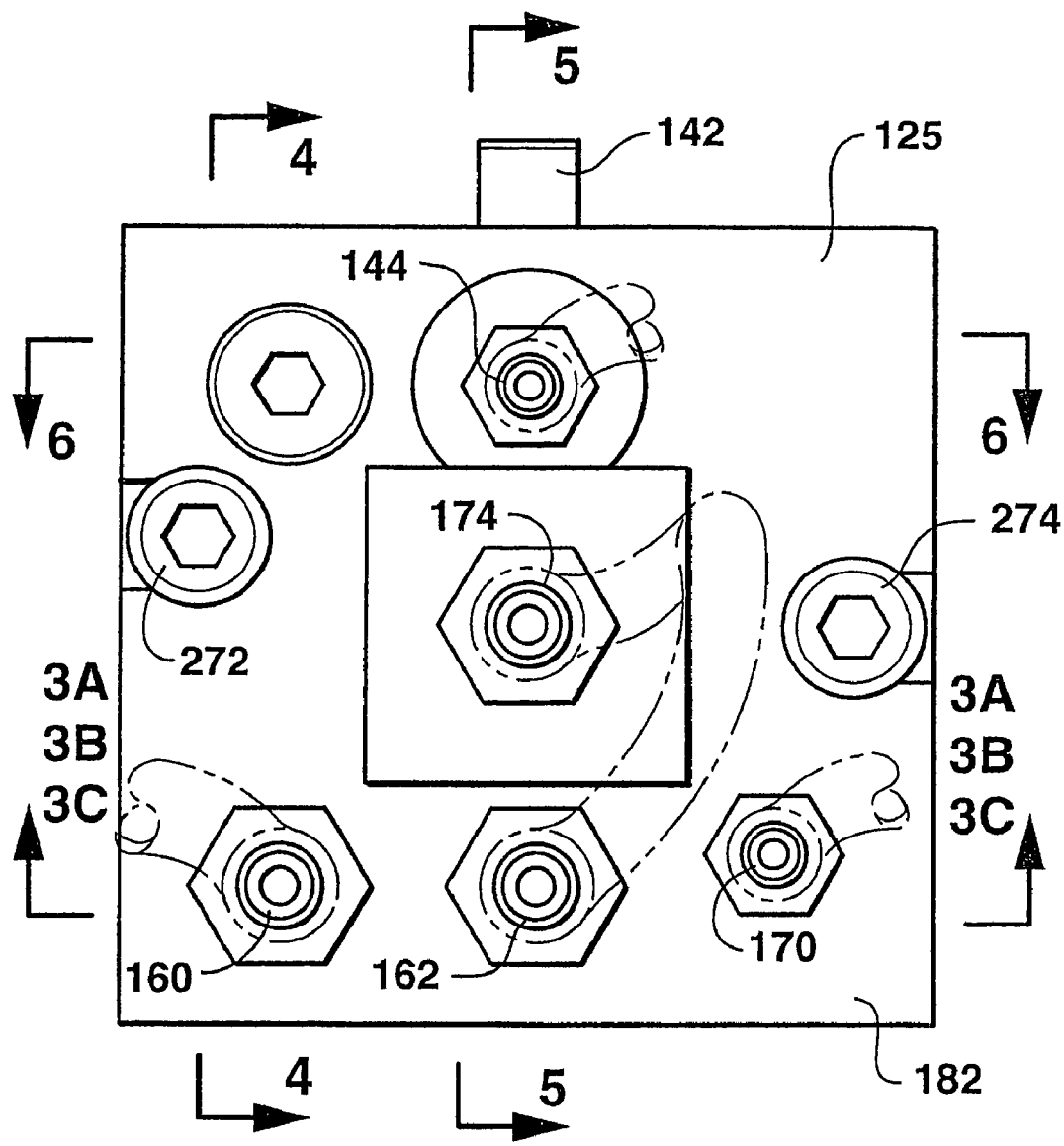
FIG. 2 is a top view of an egg injection device used in accordance with one exemplary embodiment of the ovo injection apparatus.

FIG. 2 shows a top view of the egg injection device 125. Treatment composition, such as a vaccine, that is to be delivered to the egg 120 may be introduced into the egg injection device 125 through an inlet 160. The vaccine may then be subsequently pumped out of an outlet 162 and into a syringe port 174 so as to be then transported into the treatment composition needle 130 for delivery into the egg 120 as shown in FIGS. 12A and 12C.

Figure 3B:
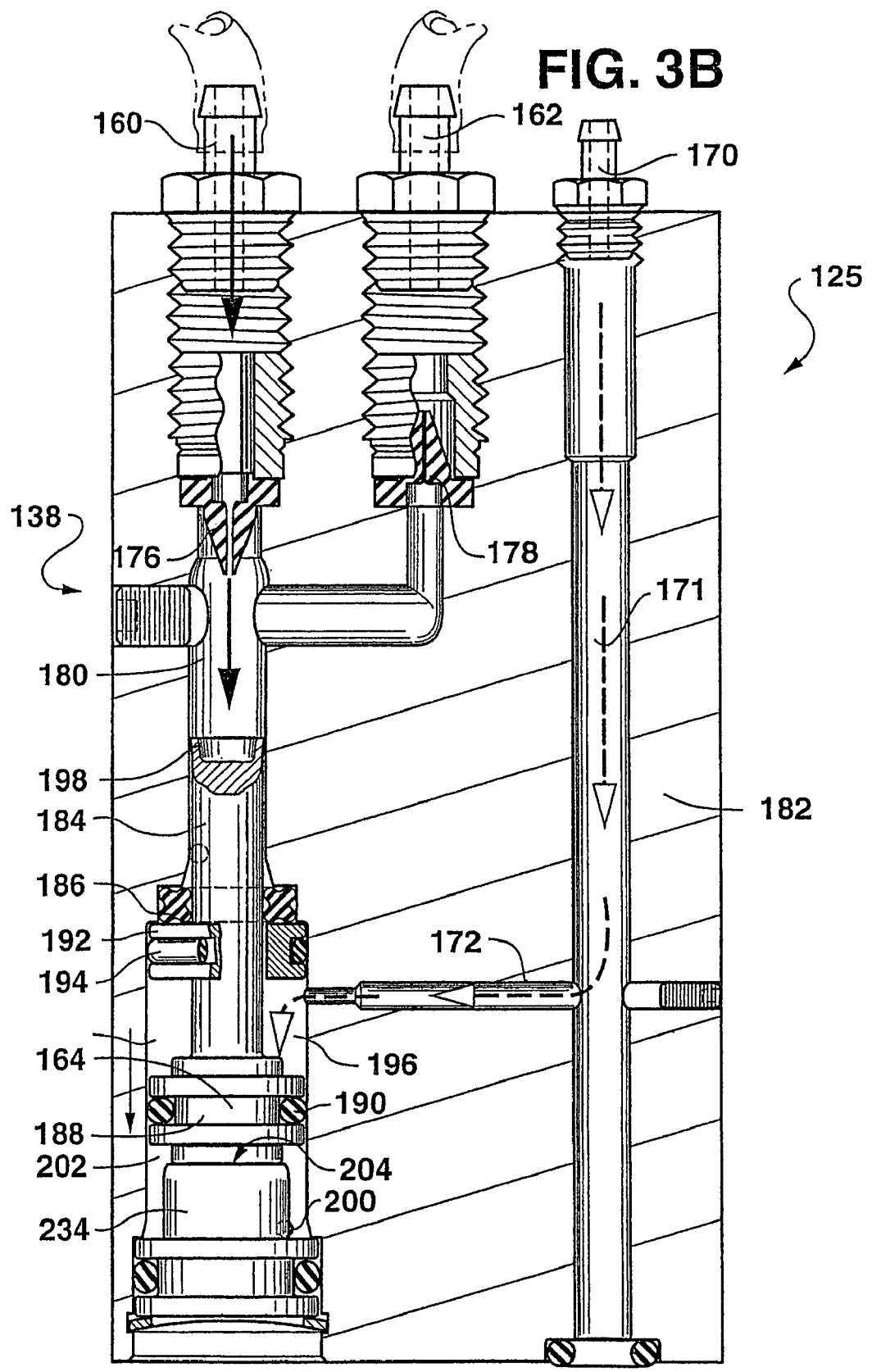
FIG. 3B is a cross-sectional view along line 3B-3B of FIG. 2 that shows treatment composition being pulled into a chamber.
Figure 3C:
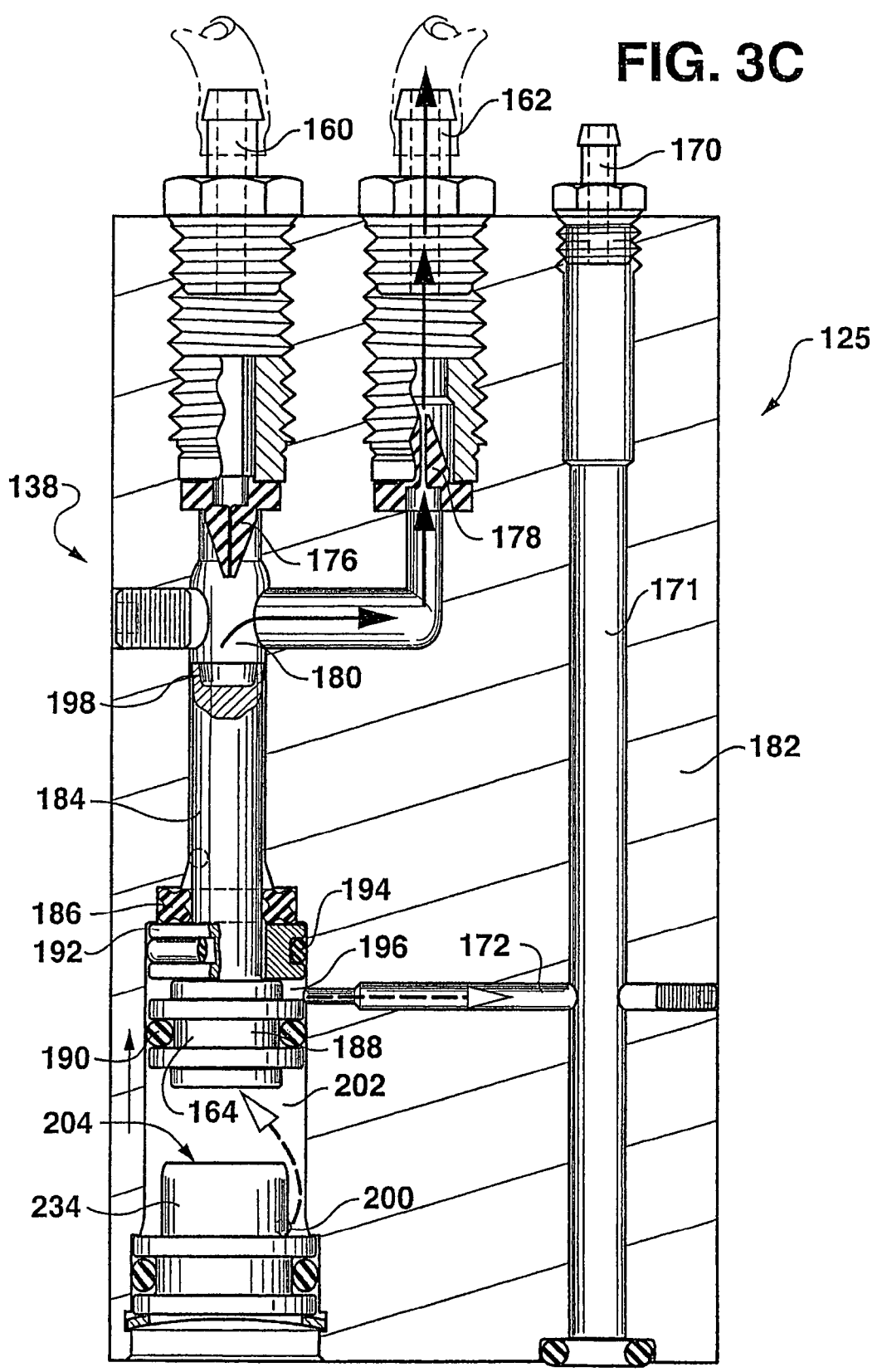
FIG. 3C is a cross-sectional view along line 3C-3C of FIG. 2 that shows treatment composition being pumped out of the chamber.

FIGS. 3A-3C demonstrate one way in which the vaccine may be pumped into and out of the egg injection device 125 in a controlled manner. FIG. 3A shows an inlet 160 into which vaccine enters and the outlet 162 through which the vaccine will exit and be moved into the treatment composition needle 130 (FIG. 12A) of the egg injection device 125. A block 182 of the egg injection device 125 may have a chamber 180 defined therein for the holding of the vaccine. A duckbill check valve or other comparable device 176 is present so as to prevent the vaccine from moving upwards and out through the vaccine inlet 160. Likewise, a second duckbill check valve or other comparable device 178 is present and limits the directional flow of the vaccine so as to be in a single direction out of the outlet 162.

A piston 164 is present in the block 182 and is rigidly attached to a shaft 184 that has a flared end or lip seal 198 on one end thereof. The lip seal 198 includes an o-ring 190. Additionally, a second lip seal 192 is present and includes an o-ring 194. The lip seal 188 may be either machined onto the piston 164 or may be attached therethrough by a fastener.

The arrangement of the lip seal 198, shaft 184, piston 164, rod bearing 192, seals 186 and 190 and 194 are shown in FIGS. 3A-3C and represent only one exemplary embodiment. As will be discussed later, the piston 164, lip seal 198, shaft 184, piston 164, rod bearing 192, seals 186 and 190 and 194 may be variously configured in accordance with other exemplary embodiments.

A chamber 196 is defined between the seals 186 and 190. A pressurized fluid, such as air, may be introduced into the block 182 through the gas inlet/outlet port 170. FIG. 3B shows air being introduced through the gas inlet/outlet port 170 and into the block 182. The air will move through a passageway 171 and then through a gas passageway 172 and enter the chamber 196 that is defined between the lip seals 188 and 192. A plug 206 may be present so as to allow for drainage of the air introduced through the gas inlet/outlet port 170. Introduction of air into the chamber 196 causes a downward movement of the piston 164 as shown between comparison of FIG. 3A and FIG. 3B.

The seals 186 and 190 act to prevent air from exiting the chamber 196. Downward movement of the piston 164 will cause air in chamber 202 to be exhausted through a port 200. As the shaft 184 is connected to the piston 164, downward movement of the piston 164 will consequently cause a downward movement of the shaft 184 as demonstrated between comparison of FIGS. 3A and 3B. As the shaft 184 moves downward, the chamber 180 will increase in size. A negative pressure will then be created in the chamber 180 that will draw vaccine through the inlet 160 and cause an opening of the duckbill check valve 176 so as to draw the vaccine into the chamber 180. The flared end or lip seal 198 of the shaft 184 may be present so as to increase the negative pressure that is formed in the chamber 180 for drawing the vaccine therein. A double lipped o-ring seal 186 may be present and be positioned against both the shaft 184 and the block 182 so as to prevent vaccine or pressurized air from being transferred between the chambers 180 and 196.

Downward movement of the piston 164 will cause the chamber 202 to be reduced in size thus forcing air out of the port 200. The air exited out of the port 200 may then be subsequently vented to the atmosphere or may be used for other purposes in the egg injection device 125 in accordance with various exemplary embodiments.

FIG. 3C shows the piston 164 pumping the vaccine out of the outlet 162. Here, pressurized fluid, such as air, is introduced through the port 200 into a chamber 202 that is defined in the block 182 on one side of the piston 164. Introduction of air into the chamber 202 will cause the piston 164 to move upwards thus increasing the size of the chamber 202 and decreasing the size of the chamber 196. Since the shaft 184 is connected to the piston 164, upward movement of the piston 164 will necessarily cause an upward movement of the shaft 184 thus reducing the size of the chamber 180. Since vaccine is present in the chamber 180, the vaccine will be pushed out of the chamber 180 and through the duckbill check valve 178 thus exiting the block 182 through the outlet 162. As the chamber 196 decreases in size, air contained within will be exited through the passageway 172, 171, and 170.

A stop surface 204 may be present so as to limit the downward movement of the piston 164. The location of the stop surface 204 may be adjusted so as to increase or decrease the stroke of the piston 164. This adjustment will likewise cause an increase or decrease in the volume of the vaccine that will be drawn into the chamber 180 and subsequently pumped from the block 182. It is to be understood, however, that the piston 164 may be variously adjusted so as to provide for any desired amount of vaccine to be pumped from the block 182 in other exemplary embodiments.

Figure 4:
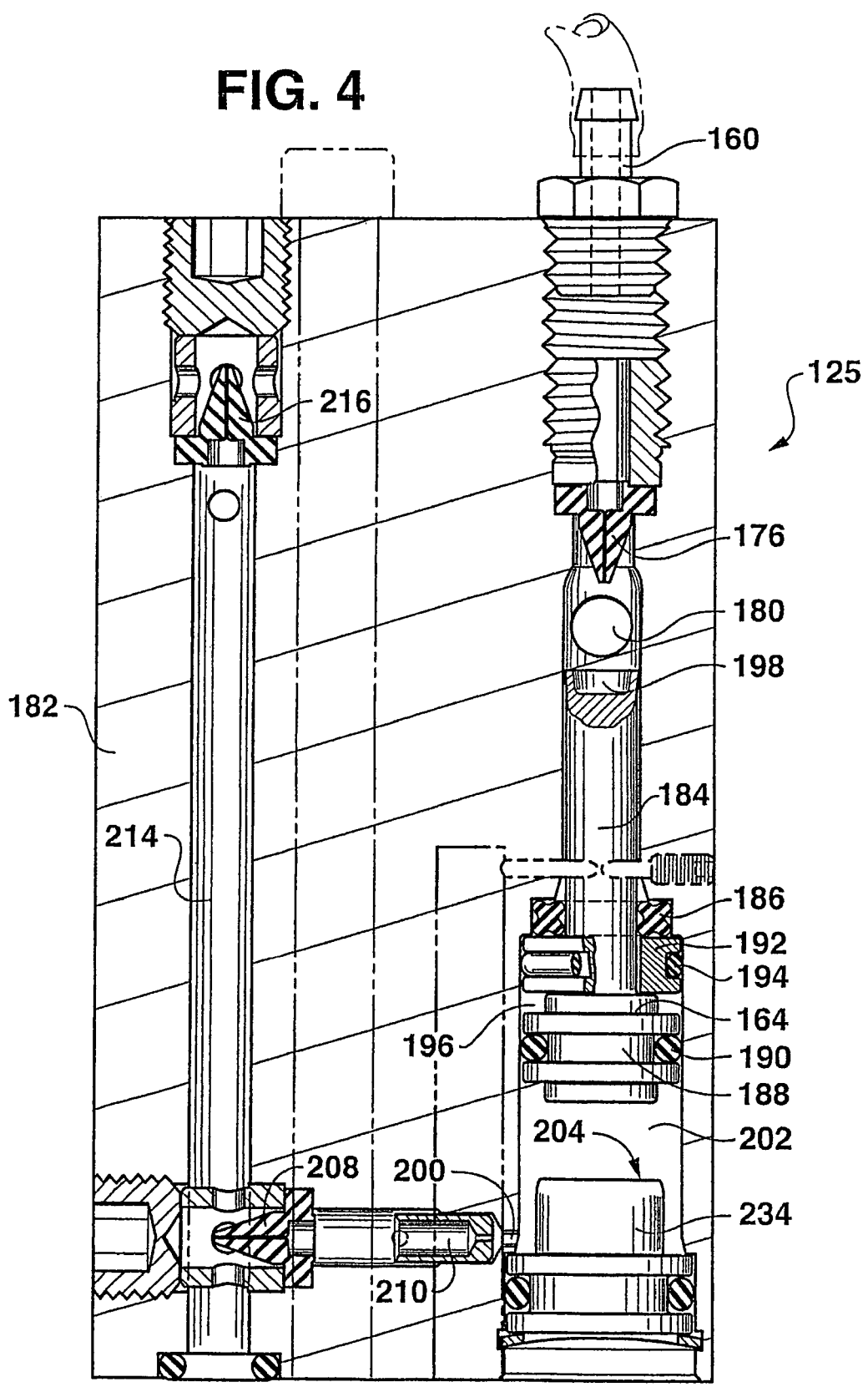
FIG. 4 is a cross-sectional view along line 4-4 of FIG. 2.

FIG. 4 is a cross-sectional view taken along line 4-4 of FIG. 2. Here, a passageway 210 is shown that may be used in order to transport pressurized air through the port 200 and into the chamber 202 so as to increase the size of the chamber 202 and hence move the piston 164 upwards. Likewise, downward movement of the piston 164 will cause air from the chamber 202 to be transported through the port 200 and back into the passageway 210. A duckbill check valve or comparable device 208 is present to control the directional flow of air in the system.

Referring to FIG. 12A, each egg injection device 125 includes an activation foot 142. When the foot 142 is in a downward position as shown in FIGS. 12A and 5A, the egg injection device 125 is enabled allowing the syringe 140 to be extended and a treatment composition to be injected into the eggs 120. If the foot 142, however, is positioned in an upward position, the egg injection device 125 is disabled and no treatment composition is dispensed.

As shown in FIG. 1, when an egg 120 is present on the flat 115, movement of the egg injection device 125 is halted which maintains the foot 142 as shown in FIGS. 12A and 5A above the stationary plate 128. In this manner, the foot 142 is maintained in a downward position enabling the egg injection device 125. If, on the other hand, no egg 120 is present in the flat 115, the egg injection device 125 moves downwardly a farther distance causing the foot 142 to contact the stationary plate 128. Due to the contact, the activation foot 142 is pushed upwardly disabling the egg injection device 125. In this manner, the egg injection device 125 only dispenses a treatment composition when an egg 120 is sensed. In the past, on the other hand, conventional systems dispensed treatment compositions whether or not an egg 120 was present on the flat 115. Unfortunately, these past systems created excessive amounts of waste adding significant expense to the process. The egg injection devices 125 of the present invention, however, only dispense a treatment composition when an egg 120 is sensed thus minimizing any waste.

Figure 6:
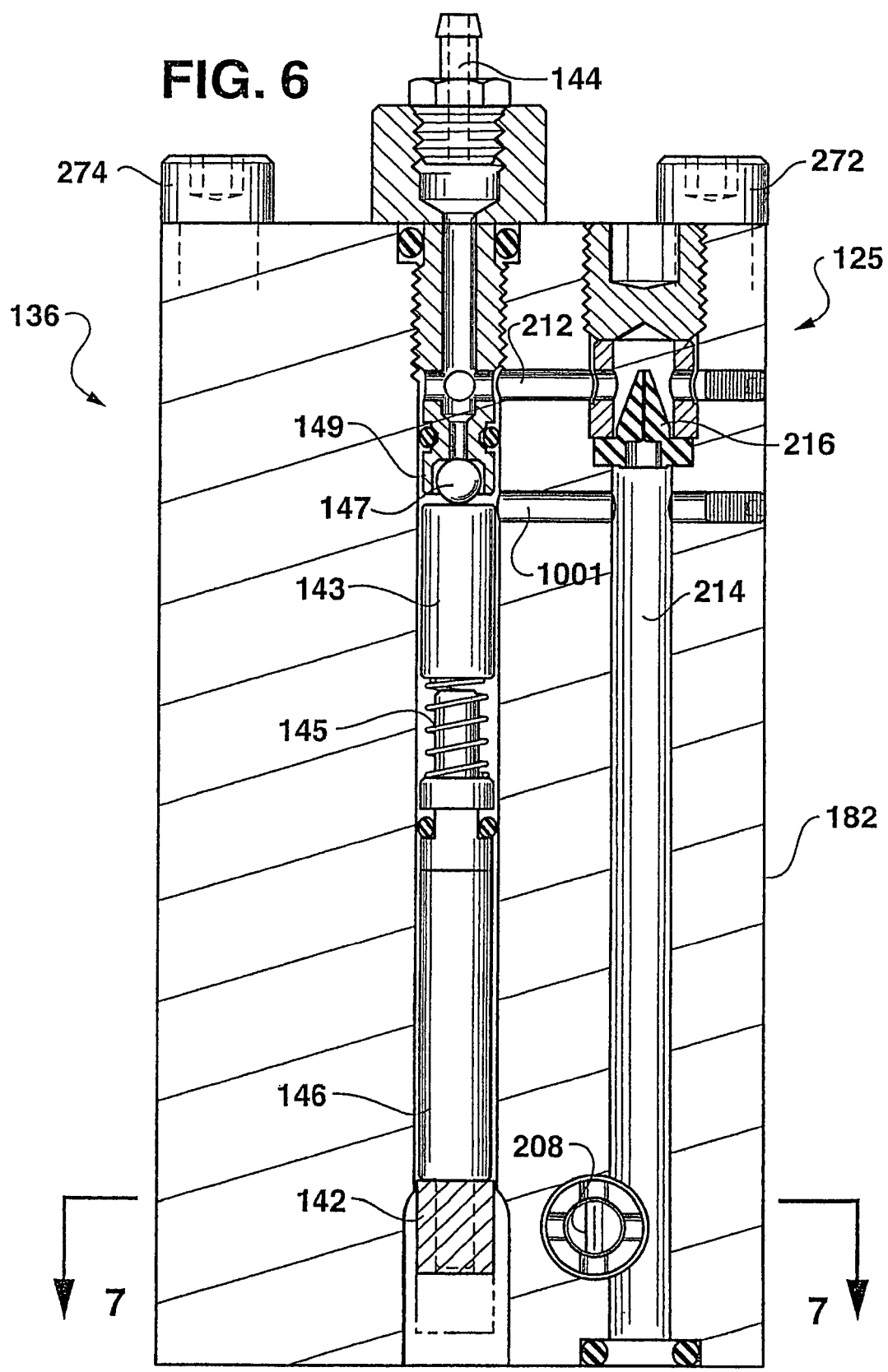
FIG. 6 is a cross-sectional view along line 6-6 of FIG. 2.

FIG. 5A shows the activation foot 142 in a downward position thus enabling the egg injection device 125 and allowing the extendable syringe 140 to move and/or allowing the vaccine to be injected therefrom. The activation foot 142 is rigidly connected to a rod 146 that extends through a bore in the block 182. The rod 146 is in communication with a cylinder 143 through a spring 145. The cylinder 143 contacts a ball 147 on one end. A gas inlet 144 is provided and receives a pressurized source of gas, such as air. For example, in one embodiment, air at a pressure of at least about 55 psi is connected to the gas inlet 144. As shown in FIG. 5A, the ball 147 is positioned away from a cup 149 so as to allow the pressurized air to be moved through the gas inlet 144 and into a passageway 150 and passageway 1001 (FIG. 6). The pressurized air may then be transported from the passageway 150 and used so as to active the composition dispensing device 138. Pressurized air in passageway 1001 (FIG. 6) is used to extend the extendable syringe 140 as will be described in more detail below. As such, FIG. 5A shows an arrangement in which air pressure may be used so as to extend the extendable syringe 140 and allow for activation of the composition dispensing device 138.

FIG. 5B shows the egg injection device 125 after downward movement that causes the activation foot 142 to contact an object, such as the stationary plate 128 in FIG. 1, and cause a disablement of the extendable syringe 140 and vaccine injection of the composition dispensing device 138. Here, the activation foot 142 is moved in an upward direction which forces the ball 147 into the cup 149. At this point, pressurized gas, such as air, will not be able to move through the gas inlet 144 and into the passageway 150 and passageway 1001 (FIG. 6) to cause activation of the composition dispensing device 138 and the extendable syringe 140. As such, when the activation foot 142 is moved upwards the ball 147 will act to block airflow into the passageway 150. Air injected through the gas inlet 144 may then either be vented to the atmosphere or may be used to activate some other component of the egg injection device 125 in accordance with various exemplary embodiments.

Once the force urging the activation foot 142 upward is removed, the ball 147 may be removed from the cup 149 through the release of the potential energy stored in the spring 145 that was compressed during upward movement of the rod 146. Here, the cylinder 143 and the ball 147 may be moved downward upon extension of the spring 145, or these components may be forced downward through air pressure supplied through the gas inlet 144. The spring force of spring 145 may be selected so as to activate and deactivate as a result of any desired force on foot 142 or air pressure through gas inlet 144. It is to be understood that air pressure through the gas inlet 144 is not needed to move the ball 147 out of the cup 149 in accordance various exemplary embodiments. Once moved downward, the ball 147 and other related components will be returned to an activation state as shown in FIG. 5A thus allowing the activation of the egg injection device 125.

FIG. 6 shows a cross-sectional view taken along line 6-6 of FIG. 2. Here, the passageway 1001 is shown in communication with a passageway 214 that moves downward through the block 182. Although FIG. 6 shows the deactivated position, if opened, pressurized air would be moved from the gas inlet 144 through the passageway 1001 and into the passageway 214. The air would then move downward through the passageway 214 and out of the bottom of the block 182 so as to move a hollow shaft 154 of the syringe cylinder 152 as will be momentarily described. FIG. 6 shows the egg injection device 125 in a deactivated position; airflow through the gas inlet 144 is directed through a passageway 212 and may be vented from the block 182 or may be used to drive another component of the egg injection device 125 in accordance with other exemplary embodiments. The passageway 214 includes a duckbill check valve 216 so as to control directional movement of air therethrough.

Figure 7:
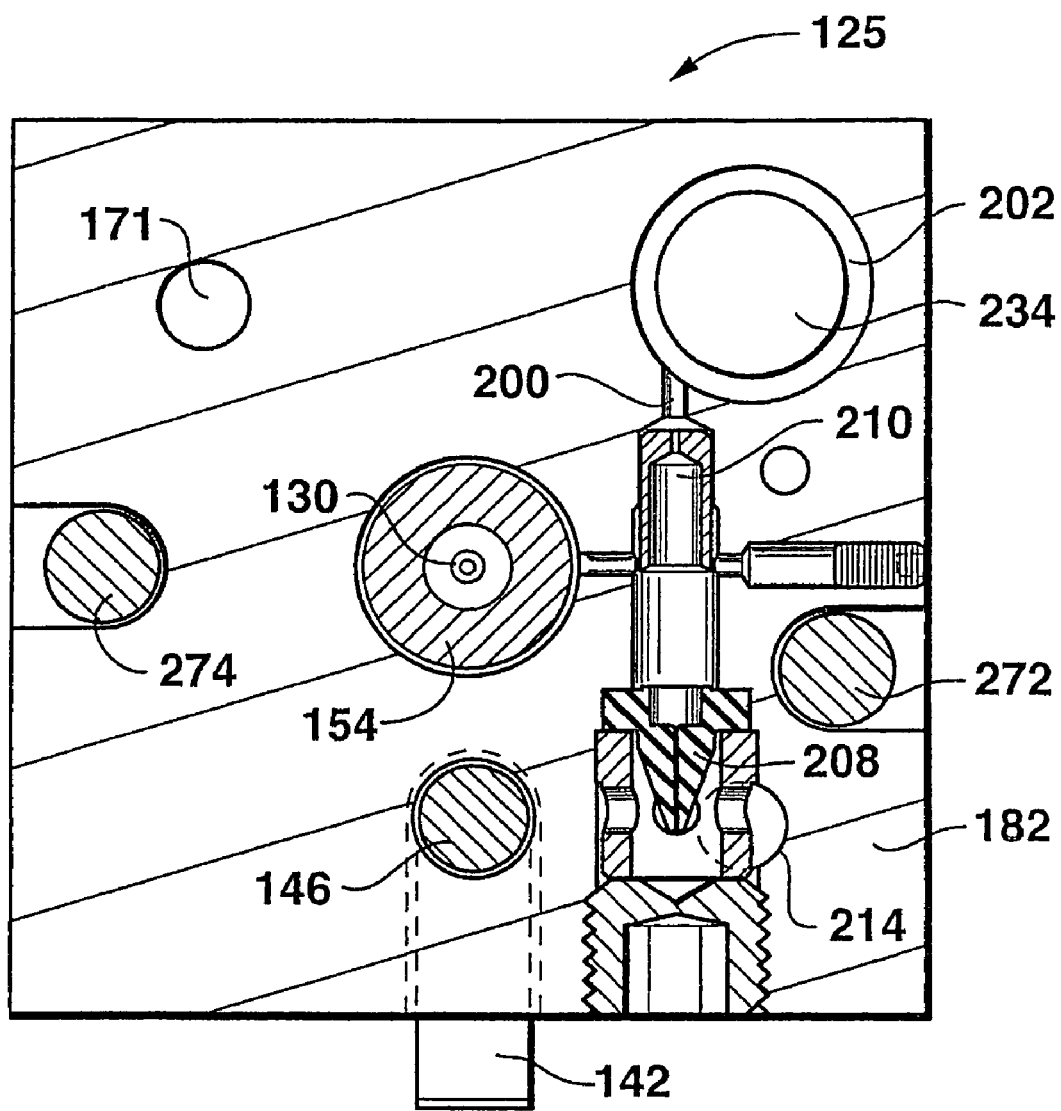
FIG. 7 is a cross-sectional view along line 7-7 of FIG. 6.

FIG. 7 shows a cross-sectional view of the egg injection device 125 along line 7-7 of FIG. 6. Here, the passageway 214 is shown in communication with the passageway 210 through the duckbill check valve 208. Air moved out of the passageway 210 through the duckbill check valve or comparable device 208 may then be either vented to the atmosphere and/or moved through the passageway 214 in accordance with various exemplary embodiments.

Figure 10A:
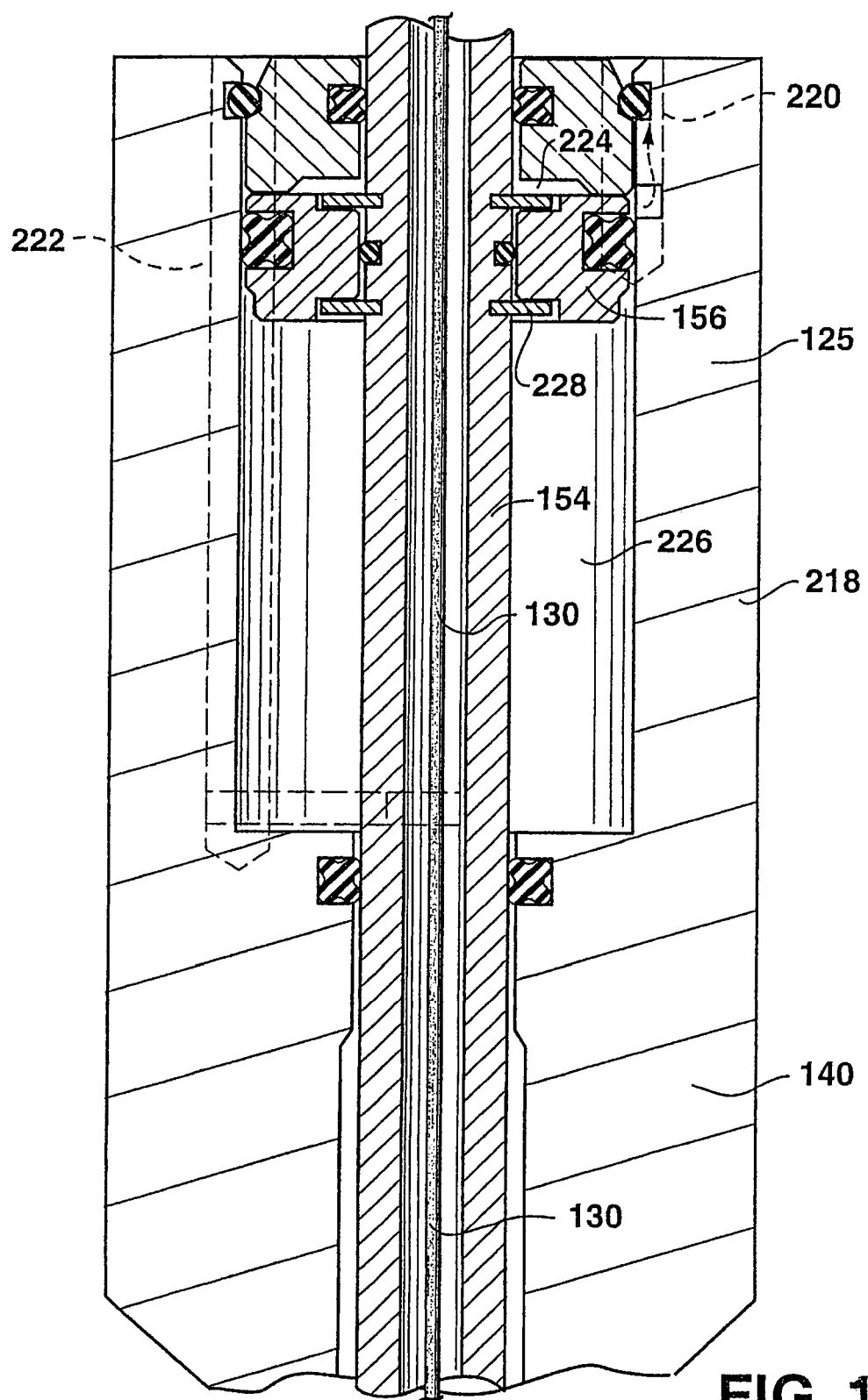
FIG. 10A is cross-sectional view of a portion of the egg injection device in which the hollow shaft is in a retracted position.

FIG. 10A shows a cross-sectional view of a portion of a block 218 of the egg injection device 125 that is mated to and connected with the block 182. FIG. 12A shows a full cross-sectional view of the block 218 and related components. Referring back to FIG. 10A, the hollow shaft 154 and the treatment composition needle 130 extend through a bore in the block 218. The hollow shaft 154 is rigidly connected to a piston 156 through a connection 228. As such, if the piston 156 moves in relation to the block 218, the hollow shaft 154 will likewise move in relation to the block 218. An upper chamber 224 is defined in the block 218 and is located on one side of the piston 156. Likewise, a lower chamber 226 is defined in the block 218 and is located on the other side of the piston 156.

Figure 8:
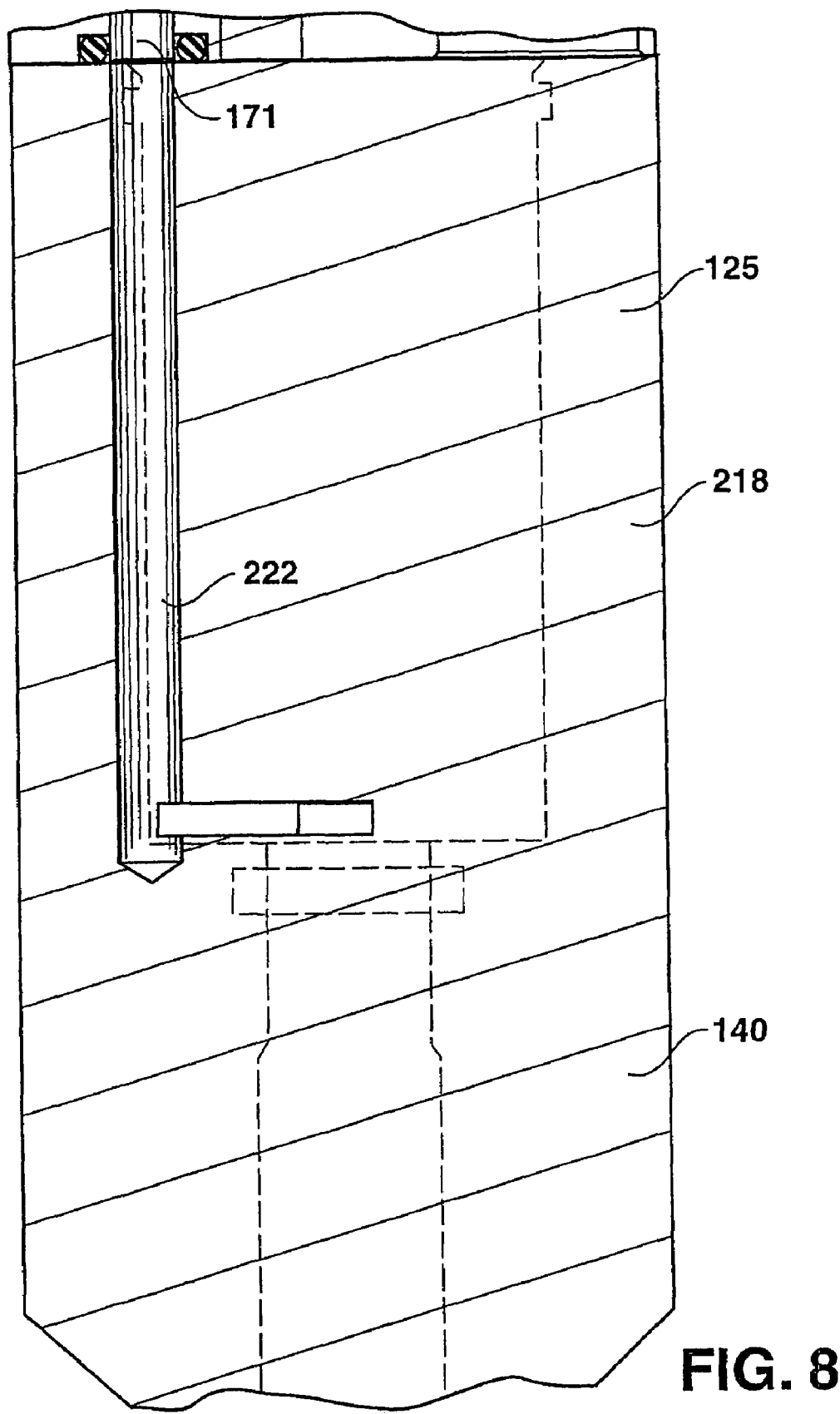
FIG. 8 is a cross-sectional view of a portion of the egg injection device that shows a passageway that is used to inject fluid therethrough so as to retract a hollow shaft.
Figure 9:
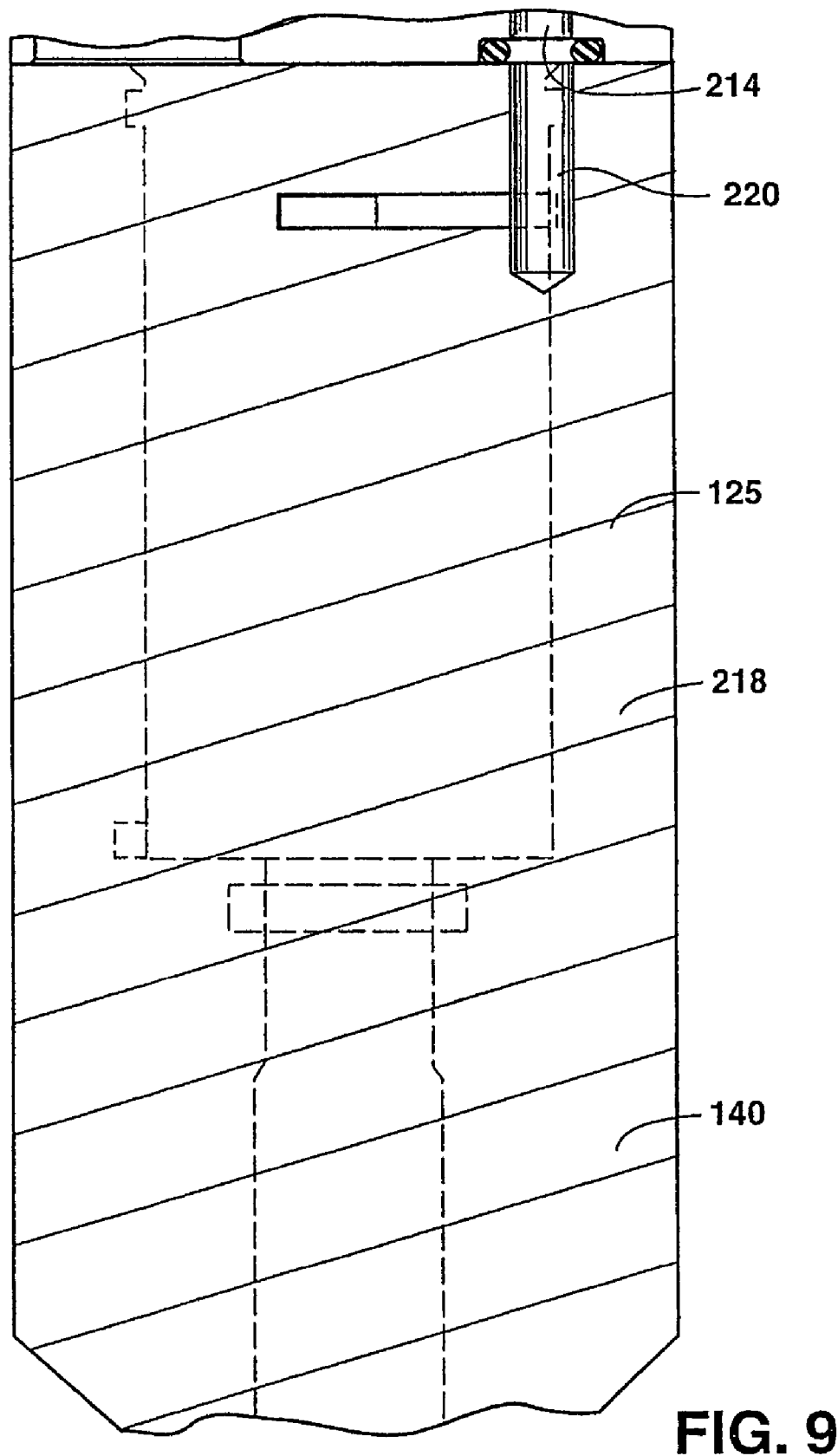
FIG. 9 is a cross-sectional view of a portion of the egg injection device that shows a passageway that is used for the injection of fluid therethrough in order to extend the hollow shaft.

FIG. 8 shows a passageway 222 defined in the block 218 and in communication with the lower chamber 226 in FIG. 10A. The passageway 222 is placed into communication with the passageway 171 that is shown in FIG. 3A as receiving air and exiting air from the gas inlet/outlet 170 and the gas passageway 172. FIG. 9 shows a passageway 220 defined in the block 218 and in communication with the upper chamber 224 shown in FIG. 1A. The passageway 220 is in communication with the passageway 214 shown in FIG. 6 and previously described.

Figure 10B:
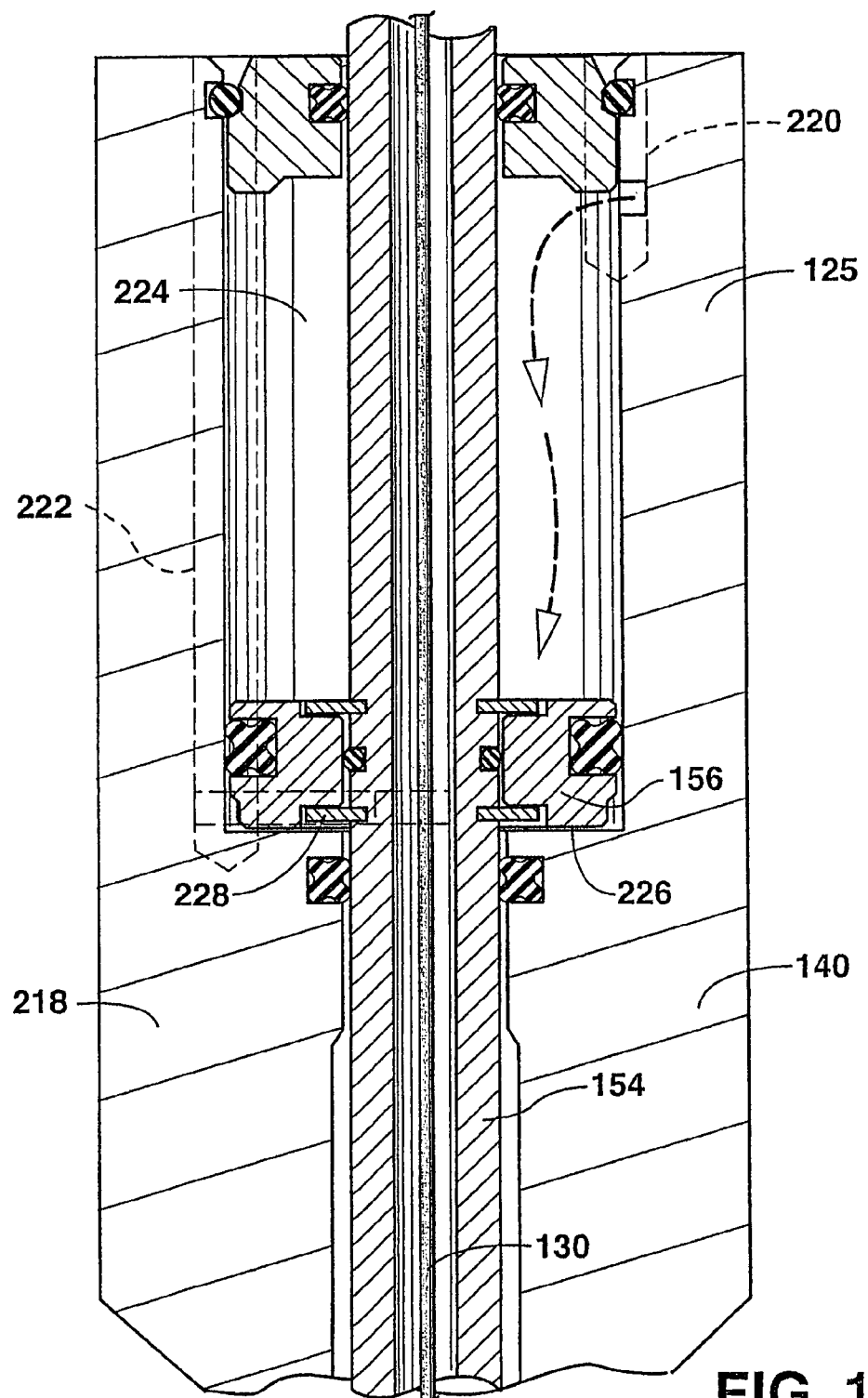
FIG. 10B is cross-sectional view of a portion of the egg injection device in which the hollow shaft is in an extended position.

FIG. 10A shows the hollow shaft 154 and the treatment composition needle 130 in a retracted position. In this instance, the piston 156 is moved into an upward position. A pressurized source of fluid, such as air, may be injected through the passageway 220 and into the upper chamber 224. FIG. 10B shows such an instance in which a pressurized source of fluid is injected so as to increase the size of the upper chamber 224 and thus decrease the size of the lower chamber 226. As the piston 156 moves downward, air or other fluid in the lower chamber 226 will be vented therefrom through passageway 222. As the piston 156 moves downward, the hollow shaft 154 will likewise move downward in relation to the block 218 as a result of the connection 228 between the piston 156 and the hollow shaft 154. In order to retract the hollow shaft 154, air or other pressurized fluid may be injected through the passageway 222 and into the lower chamber 226 so as to force the piston 156 upwards. The size of the upper chamber 224 will decrease and force air or other fluid therein to exit through the passageway 220.

Therefore, the egg injection device 125 may be configured so that air injected through the gas inlet/outlet 170 acts to both move the piston 164 downward so as to draw vaccine into the chamber 180, and air injected through the gas inlet/outlet 170 will be transferred through the passageway 222 and into the lower chamber 226 so as to withdraw the hollow shaft 154. Likewise, the egg injection device 125 may be configured so that air injected through the gas inlet 144 will be transferred through the passageways 214 and 220 so as to enter the upper chamber 224 and cause the hollow shaft 154 to extend, and air injected through the gas inlet 144 will be transferred through the port 200 so as to move the piston 164 upward to transfer vaccine in the chamber 180 into the treatment composition needle 130.

Alternatively, the egg injection device 125 may be configured so that different sources of air may be used to actuate the pistons 164 and 156. As such, the egg injection device 125 may be configured so that only a single input of pressurized air may cause the pistons 156 and 164 to actuate. Alternatively, a separate input may be used to activate piston 156 while another input is used to activate piston 164. Still further, a pair of inputs may be used to activate each one of the pistons 156 and 164 such that one input moves the piston 156 down while another input moves the piston 156 up, and in a similar manner one input moves the piston 164 down while a separate input moves the piston 164 up. As such, the actuation of the pistons 156 and 164 may or may not be associated with one another through the various inputs. The configuration shown in the drawings is but one exemplary embodiment and it is to be understood that other configurations are possible.

In one particular embodiment, the egg injection device 125 may be placed in communication with a controller, such as a programmable logic unit or microprocessor. The microprocessor may, in turn, be in communication with a valve device such as a solenoid valve that controls gas flow through the gas inlet 144 and the gas inlet/outlet 170. In one embodiment, based on a timing sequence, the controller may be configured to reverse the gas flow through the egg injection device 125 once the treatment composition is dispensed through the treatment composition needle 130. Thus, in this embodiment, once the treatment composition is dispensed, pressurized gas is fed through the gas inlet/outlet 170 and exhausted through the passageway 210. By reversing gas flow, piston 164 is caused to move downwardly causing treatment composition to be fed in through the composition inlet 160. The reverse gas flow also causes the piston 156 to move in an upwards direction for retracting the treatment composition needle 130. Referring to FIG. 1, in coordination with reverse gas flow, the egg injection devices 125 may also be retracted. In this manner, a cycle is completed and the egg injection devices 125 are positioned in order to repeat the process as the eggs 120 are conveyed down the conveyor 122.

FIG. 11 is a cross-sectional view of a portion of the egg injection device 125. FIG. 11 shows the spatial relationship between the blocks 182 and 218 of the egg injection device 125. As shown, the hollow shaft 154 and the treatment composition needle 130 extend through approximately the center of the blocks 182 and 218. A series of o-ring seals are present along the length of the hollow shaft 154. The various o-ring seals help prevent pressurized fluid from being transferred at unwanted locations along the exterior of the hollow shaft 154. Additionally, other o-ring seals are present within the egg injection device 125 for providing other sealing functions as shown. As shown in FIG. 2, screws 272 and 274 may be present so as to allow for attachment of the block 182 to the block 218.

FIG. 12A shows the egg injection device 125 with the activation foot 142 in a downward position and shows the relationship between the egg injection device 125 and the stationary plates 128. The egg injection device 125 may be moved downward via any conventional mechanism towards the egg 120, or the egg 120 may be moved upwards towards the egg injection device 125. Alternatively, relative movement between the egg injection device 125 and the egg 120 may be accomplished through movement of both the egg injection device 125 and egg 120. When the egg injection device 125 is lowered onto the top of the egg 120, the egg injection device 125 may be configured so as to push back upwards a small amount so as to account for variations of the size of the eggs 120. Additionally or alternatively, the egg locator head 126 may be configured with a spring assembly 232 so as to move upwards in relation to the syringe cylinder 152 of the egg injection device 125 to account for variations in the size of the egg 120. A plurality of inflatable tubes 230 may be provided and may be located around various portions of the egg injection device 125. The inflatable tubes 230 may be inflated so as to be urged against and lock the egg injection device 125 into a particular location. Clearance between the outer surface of the egg injection device 125 and the stationary plates 128 may be relatively loose in accordance with various exemplary embodiments. However, as previously discussed, the egg injection device 125 may be in fact rigidly connected to the stationary plates 128 in accordance with other exemplary embodiments.

The egg injection device 125 may be lowered a certain amount, for example ½ an inch, to cause the punch needle 132 to puncture the egg 120 as shown in FIG. 12B. It is to be understood that various mechanisms and arrangements for lowering the egg injection device 125 to puncture the egg 120 are possible. For instance, the egg injection device 125 may be lowered and the punch needle may puncture the egg 120 without the presence of the inflatable tubes 230, or the puncture of the egg 120 may occur before inflation of the tubes 230.

Once the egg 120 has been punctured by the punch needle 132, the hollow shaft 154 is lowered within the syringe cylinder 152 in a manner as previously discussed. Lowering of the hollow shaft 154 and accompanying treatment composition needle 130 is shown in FIG. 12C and cause the treatment composition needle 130 to enter the interior of the egg 120. At such time, vaccine or other treatment composition may be injected in a manner as previously discussed through the treatment composition needle 130 in order to provide a desired treatment to the egg 120.

The pressurized fluid that moves the piston 156 downward so as to move the hollow shaft 154 downward, also, in one embodiment, can be used to pump the treatment composition through the treatment composition needle 130 as previously discussed. It should be understood, however, that in other embodiments the treatment composition may be pumped through the treatment composition needle 130 by other external means.

Of particular advantage, the composition dispensing device 138 as described above is capable of dispensing very precise amounts of the treatment composition, even at volumes of less than about 500 microliters, such as less than about 250 microliters. For example, in one embodiment, the composition dispensing device 138 may be configured to dispense amounts of from about 1 microliter to about 100 microliters, such as from about 25 microliters to about 75 microliters.

The amount of composition that is dispensed by the dispensing device 138 generally depends upon the diameter of the bore in which the lip seal 198 is positioned and the stroke length of the piston 164. In order to change the volume of the composition that is dispensed, the stroke length of the piston 164 may be varied as desired.

Figure 13:
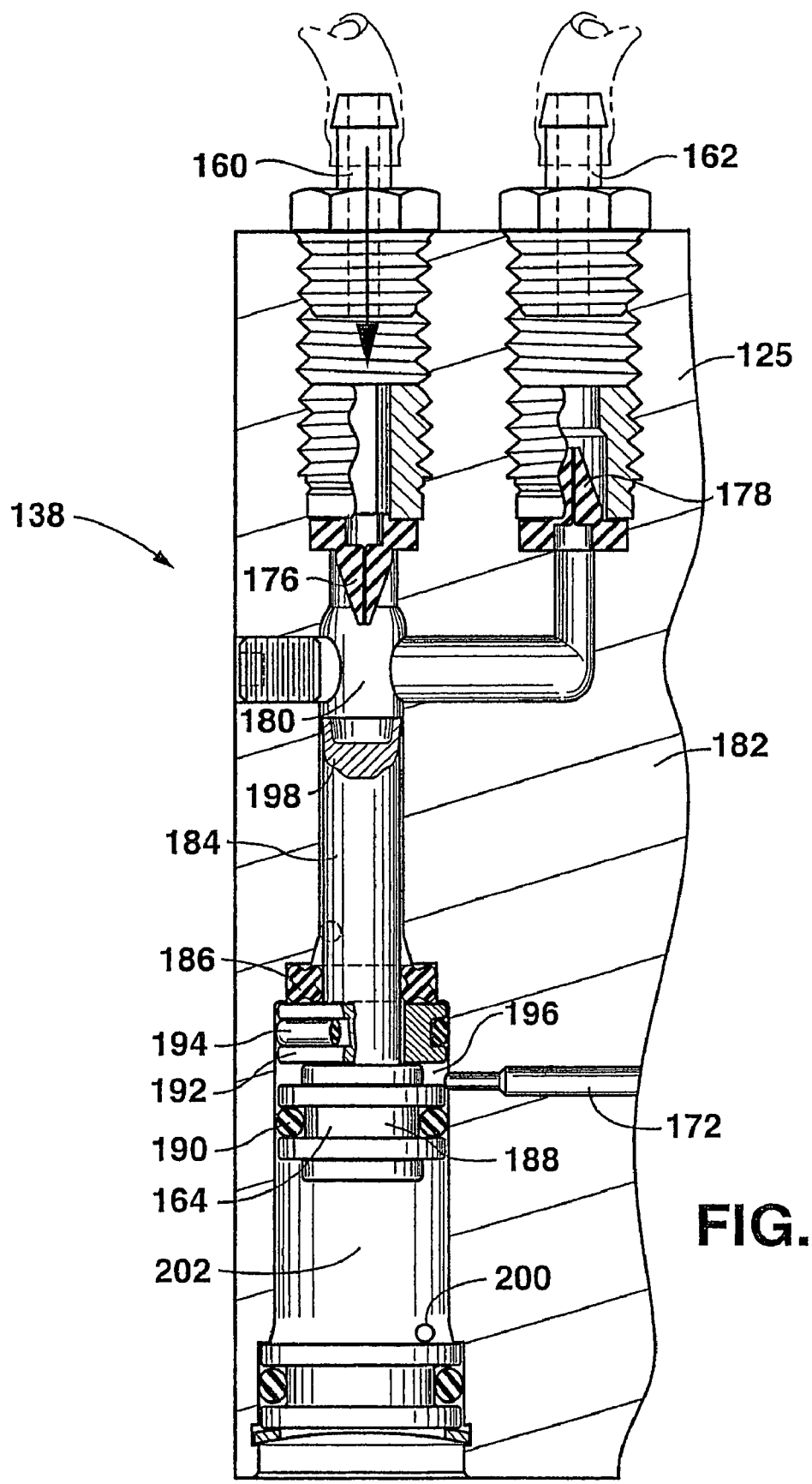
FIG. 13 is a cross-sectional view of a portion of an alternative exemplary embodiment of an egg injection device that lacks a piston stop so as to allow for a greater stroke of the piston and subsequently the delivery of a greater volume of treatment composition to the egg.

FIG. 13 shows an alternative exemplary embodiment of the egg injection device 125 that is configured so as to increase the amount of treatment composition that is drawn into the chamber 180 and subsequently injected into the egg 120. Here, a piston stop 234 that was present in the exemplary embodiment shown in FIG. 3A has been removed so as to allow the piston 164 to realize a longer stroke length and subsequently cause a greater volume of the chamber 180 hence resulting in more treatment composition pulled therein. Referring back to FIG. 3A, it may be seen that the stroke length of the piston 164 is limited by the presence of the piston stop 234. Removal of the piston stop 234 in the exemplary embodiment of FIG. 13 thus allows a longer length of the shaft 184 to be removed from the chamber 180 so as to draw a greater volume of treatment composition into the chamber 180. Of course, in other exemplary embodiments, the size of the piston stop 234 may be selected so as to allow for any desired amount of treatment composition to be drawn into the chamber 180 and subsequently injected into the egg 120.

Figure 14:
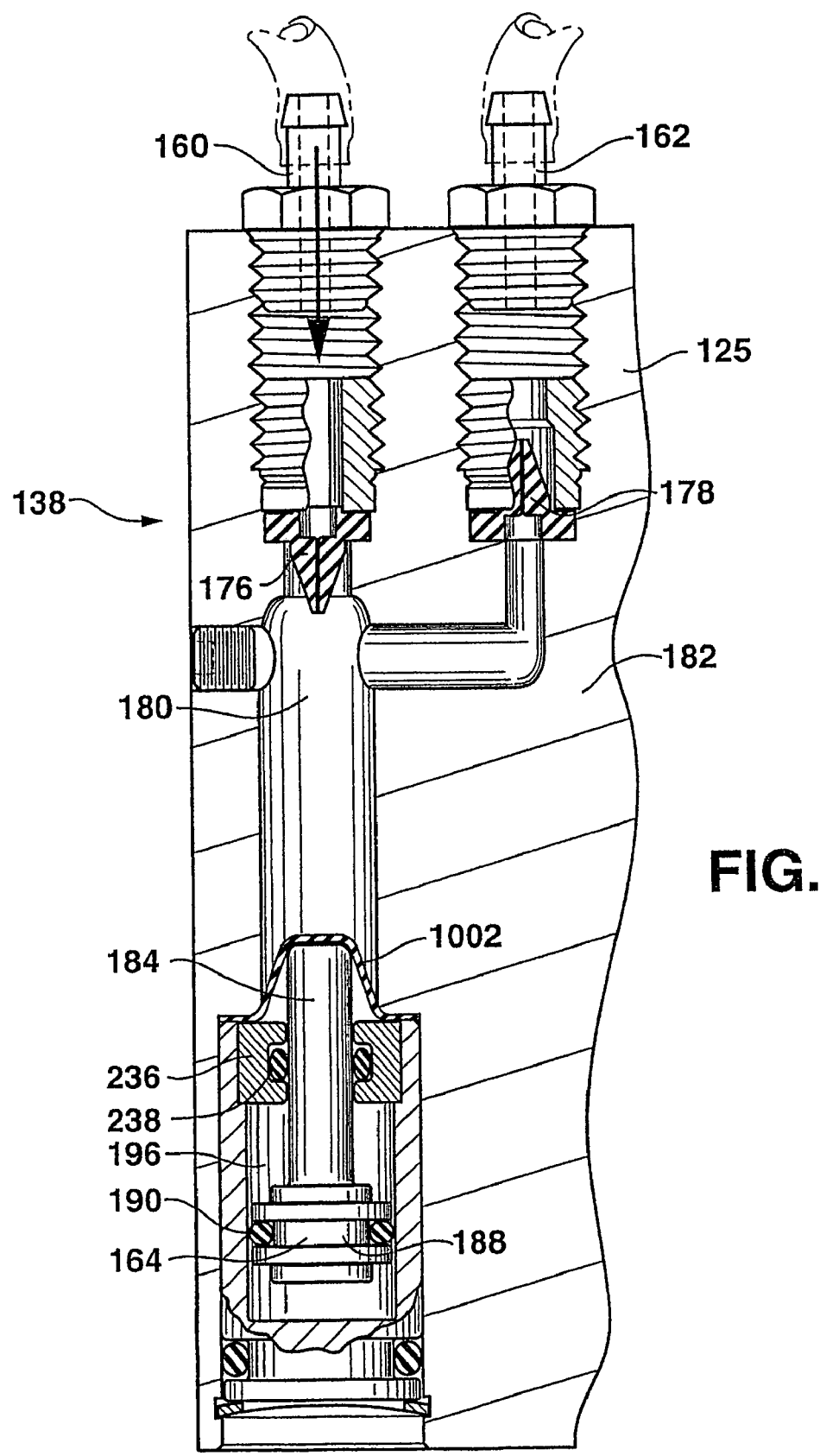
FIG. 14 is a cross-sectional view of a portion of an alternative exemplary embodiment of an egg injection device that incorporates a shaft sealing element and single diaphragm for use in pumping the treatment composition.

FIG. 14 shows an alternative exemplary embodiment of the egg injection device 125. Here, the flared end or lip seal 198, shaft 184, rod bearing 192, and seal 194 are configured differently than as shown in FIG. 3A. Specifically, the flared end or lip seal 198 of the exemplary embodiment in FIG. 3A has been replaced with a diaphragm 1002 and seal 194 has been eliminated. Sealing between the chamber 180 and 196 is still created, however, in the exemplary embodiment in FIG. 14. A shaft sealing element 236 that includes an o-ring 238 that surrounds the shaft 184 is present so as to provide a seal between the chamber 180 and the chamber 196. In FIG. 14, the shaft 184 may be sized so as to have a circumference less than that of the portion of the chamber 180 that surrounds at least a length of the shaft 184. In this manner, along with the diaphragm 1002, the treatment composition will directly contact the diaphragm 1002 but will be prevented from being transferred into the chamber 196 due to the presence of the diaphragm 1002. This arrangement is contrasted to that shown in FIG. 3A in which the shaft 184 has essentially the same circumference as the portion of the chamber 180 immediately surrounding the shaft 184 so that treatment composition will only primarily contact the flared end 198 of the shaft 184. Although not shown in FIG. 14, the gas passageway 172 may be present so as to provide a pressurized fluid, such as air, to the chamber 196.

Figure 15:
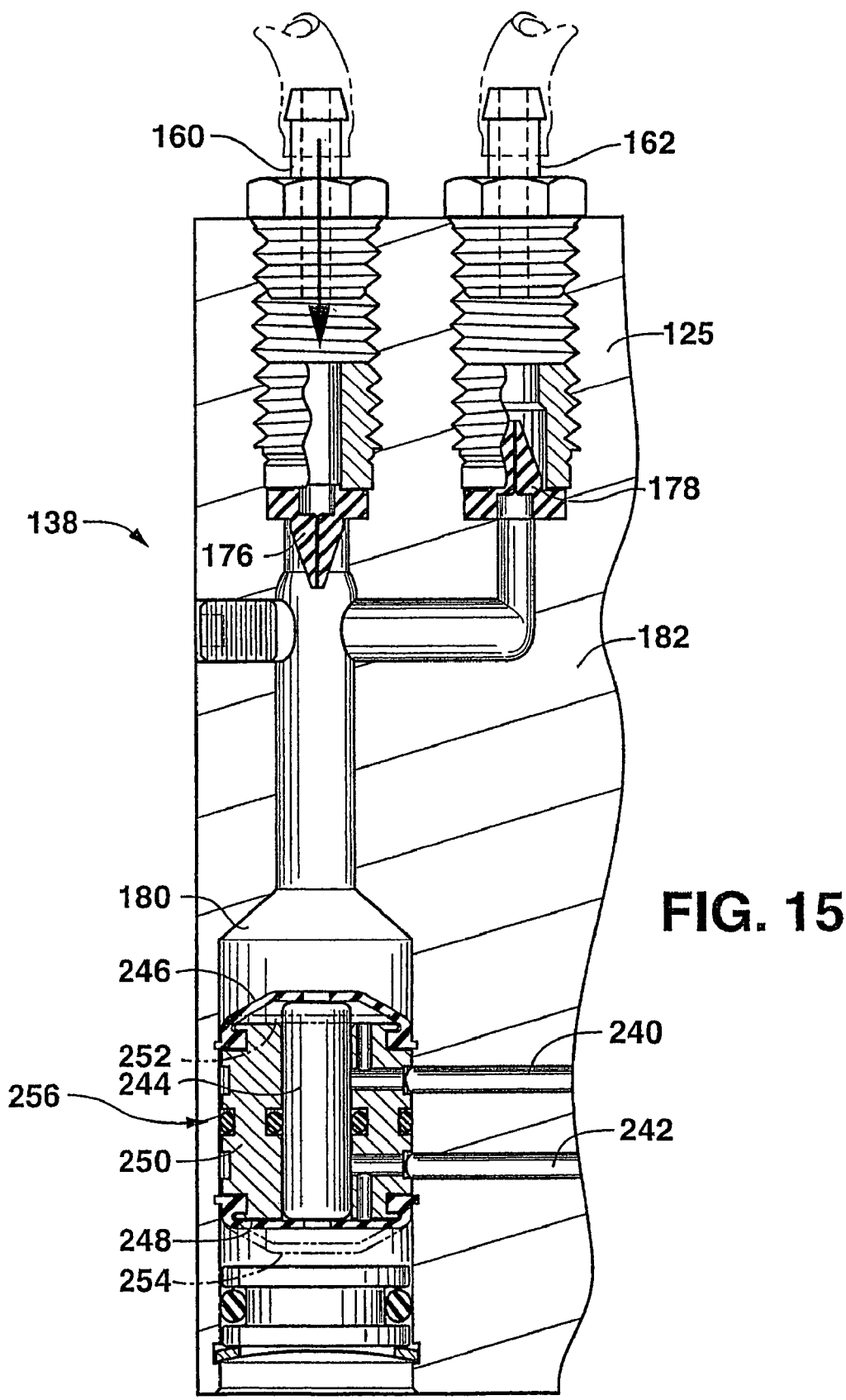
FIG. 15 is a cross-sectional view of a portion of an alternative exemplary embodiment of an egg injection device that incorporates a double diaphragm arrangement for use in pumping the treatment composition.

FIG. 15 shows another alternative exemplary embodiment of the egg injection device 125. Here, the piston arrangement 164 of the embodiment shown in FIG. 3A is replaced with a double diaphragm arrangement 256. The double diaphragm arrangement 256 functions in a manner different that the piston arrangement 164 of FIG. 3A. However, the double diaphragm arrangement 256 still acts to draw treatment composition into the chamber 180 and then pump the treatment composition therefrom in a similar manner by increasing the size of the chamber 180 so as to create a negative pressure to draw treatment composition therein and then to decrease the size of the chamber 180 in order to force the treatment composition therefrom.

The double diaphragm arrangement 256 employs a shaft 244 that has a first diaphragm 246 facing the chamber 180 and a second diaphragm 248 on an opposite end of the shaft 244. A first passageway 240 is provided in the block 182 and is in communication with the first diaphragm 246. A pressurized fluid, such as air, may be transferred through the first passageway 240 so as to force the first diaphragm 246 upwards. Doing so will move the diaphragm 246 and the shaft 244 upwards with respect to the block 182 and subsequently reduce the volume of the chamber 180 thus forcing any treatment composition therein out of the outlet 162.

The double diaphragm arrangement 256 also includes a second passageway 242 that is in communication with the second diaphragm 248. A pressurized fluid, such as air, may be forced through the second passageway 242 to urge the second diaphragm 248 and the shaft 244 downwards. This positioning is shown as a phantom position 254. In this position, the shaft 244 will also be moved downwards so as to cause the first diaphragm 246 to be moved into the phantom position 252. This positioning of the double diaphragm arrangement 256 thus causes an increase in the volume of chamber 180 thus resulting in a negative pressure and drawing treatment composition therein. As the shaft 244 and diaphragms 246 and 248 move, air or other fluid contained in the double diaphragm arrangement 256 will be vented from the first and second passageways 240 and 242 depending upon whether the double diaphragm arrangement 256 is used to pump treatment composition from the chamber 180 or draw treatment composition therein.

An insert 250 is provided in the block 182 to house the shaft 244 and provide communication between the passageways 240, 242 and the diaphragms 246, 248. A pair of o-ring seals are provided in order to maintain fluid isolation between the pressure supplied by the first passageway 240 and the second passageway 242. In accordance with various exemplary embodiments, the shaft 244 may be connected to one of, both, or neither of the diaphragms 246 and 248. Fluid pressure provided through the passageways 240 and 242 may be introduced through any of the previously mentioned ports, such as the gas inlet/outlet port 170, or may be provided through an external port in accordance with various exemplary embodiments.

Although not shown, the double diaphragm arrangement 256 of FIG. 15 may be modified in accordance with other exemplary embodiments. For instance, an exemplary embodiment may exist in which only the first diaphragm 246 is present and the second diaphragm 248 is not present. In this alternative exemplary embodiment, the seal 190 of FIG. 3A may be present instead of the second diaphragm 248. As the shaft 244 moves, the first diaphragm 246 may move in tandem with the shaft 244 so as to draw vaccine or other fluid into the chamber 180 and then pump the vaccine or other fluid therefrom.

Figure 16:
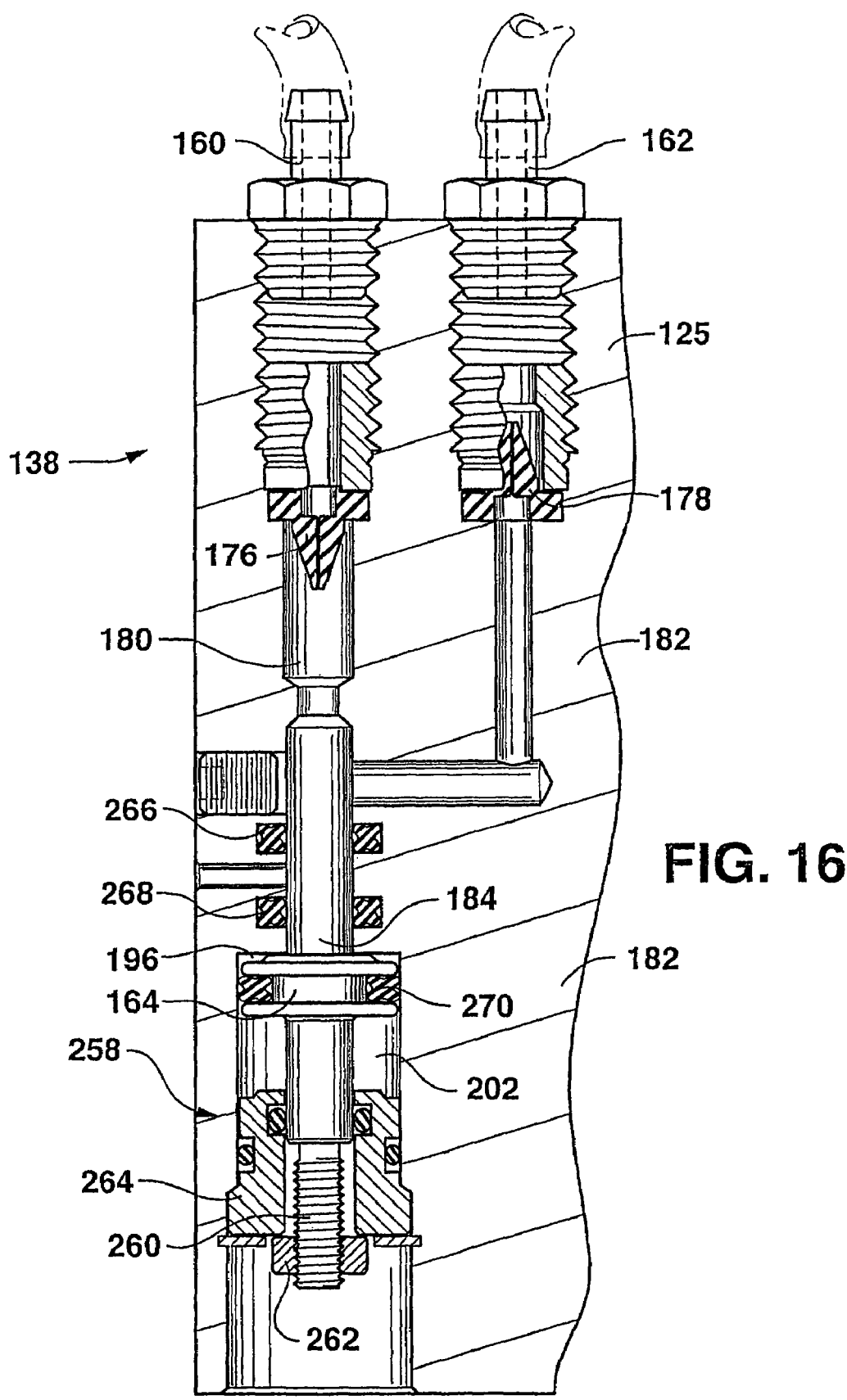
FIG. 16 is a cross-sectional view of a portion of an alternative exemplary embodiment of an egg injection device that includes an adjustable piston arrangement that allows for adjustment for the volume of treatment composition that is pumped into the egg and incorporates a double shaft sealing element for use in pumping the treatment composition.

FIG. 16 shows an alternative exemplary embodiment of the egg injection device 125 that includes an adjustable piston arrangement 258. The adjustable piston arrangement 258 allows for adjustment of the stroke of the piston 164 to adjust the amount of treatment composition that is pumped out of the chamber 180. An insert 264 is provided in the block 182 and a threaded section 260 of the shaft 184 extends therethrough. As with previous exemplary embodiments, a chamber 196 and chamber 202 are provided so as to receive an exit gas through ports (not shown) in order to move the piston 164 up and down in relation to the block 182. The piston 164 and shaft 184 therefore function in a manner similar to previous exemplary embodiments in drawing and pumping treatment composition into and out of the chamber 180. A double lipped o-ring seal or similar sealing element 270 is provided so as to maintain fluid isolation between the chambers 196 and 202. Likewise, the insert 264 is provided with seals as shown in FIG. 16 in order to prevent fluid from being transported through the insert 264 to prevent fluid leakage or loss of pressure.

A nut 262 threadedly engages the threaded section 260 of the shaft 184. The nut 262 rests against the insert 264 so as to restrain upward movement of the shaft 184 with respect to the block 182. In this manner, the stroke of the piston 164 and associated shaft 184 is limited thus limiting the amount of treatment composition drawn into and pumped out of the chamber 180. The nut 262 may be adjusted so as to move the threaded section 260 upwards or downwards. Doing so will consequently increase or decrease the stroke of the piston 164 and associated shaft 184 thus providing for a control of the amount of treatment composition that is drawn into and pumped out of the chamber 180. Access through the block 182 is provided so as to allow a user to make a desired adjustment to the nut 262 to effect the amount of treatment composition eventually dispensed by the treatment composition needle 130 into the egg 120. A pair of double lipped o-rings seals or other similar sealing element 266 and 268 are also present in the exemplary embodiment in FIG. 16 and act to provide a seal along the outer surface of the shaft 184. The shaft 184 may be sized so as to have a circumference less than that of the portion of the chamber 180 that surrounds at least a length of the shaft 184. In this manner, the treatment composition will directly contact the shaft 184. The seals 266 and 268 act to prevent treatment composition from being moved down into the chamber 196 and also to act to prevent air or other fluid injected into the chamber 196 from being inadvertently transferred into the chamber 180. This arrangement is contrasted to that shown in FIG. 3A in which the shaft 184 has essentially the same circumference as the portion of the chamber 180 immediately surrounding the shaft 184 so that treatment composition will only primarily contact the flared end 198 of the shaft 184.

In one embodiment, in between dispensing of the treatment composition, a sanitizing fluid may be fed through the extendable syringe 140 for sanitizing the treatment composition needle 130 and the punch needle 132. The sanitizing fluid may be connected to the syringe and controlled by the controller if desired. The sanitizing fluid may be released over the extendable syringe 140 after each cycle or at selected times during use of the egg injection devices 125.

As stated above, in addition to being used in egg injection systems 100, it should be understood that the dispensing device of the present invention may be used in numerous other applications in various fields. For instance, the dispensing device may be used to dispense controlled amounts of chemical compositions during the production of pharmaceutical products, chemical products, semiconductor devices, and food products. When used in other applications, it should be understood that the egg sensing device 136 may be eliminated from the design or replaced with another type of sensing device, such as a photosensor if desired. In other applications, a retractable needle may also not be needed. For example, in other embodiments, the dispensing device may include the pneumatically controlled composition dispensing device 138 in conjunction with some type of delivery system. The delivery system may comprise a retractable needle as shown in the figures or may comprise any other suitable stationary or movable channel.

These and other modifications and variations to the present invention may be practiced by those of ordinary skill in the art, without departing from the spirit and scope of the present invention. In addition, it should be understood that aspects of the various embodiments may be interchanged both in whole or in part. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An integrated pneumatically operated dispenser comprising:
    a fluid supply in communication with a treatment composition;
    a first piston in communication with the fluid supply, the first piston moving between a first position and a second position and wherein movement from the first position to the second position causes a selected amount of treatment composition from the fluid supply to be drawn into a chamber within the dispenser, and movement of the piston from the second position to the first position causes the selected amount of the treatment composition to be forced out of the chamber;
    an injection device in communication with the chamber for receiving the treatment composition when the first piston moves from the second position to the first position;
    a second piston connected to the injection device, the second piston moving between a first position where the injection device is retracted and a second position where the injection device is extended; and
    a first gas inlet and a second gas inlet, the first and second gas inlets being in communication with the first piston and the second piston, wherein, by flowing a gas into the first gas inlet, the first piston moves from the first position to the second position and the second piston is forced toward the first position where the injection device is retracted, and wherein, by flowing a gas into the second gas inlet, the first piston moves from the second position to the first position and the second piston is forced towards the second position for dispensing the treatment composition while the injection device is extended.

2. An integrated pneumatically operated dispenser as defined in claim 1, wherein the dispenser includes a housing and wherein the first piston and the second piston are contained in the housing.

3. An integrated pneumatically operated dispenser as defined in claim 1, wherein a distance the first piston moves between the first position and the second position is adjustable for adjusting the selected amount of the treatment composition that is drawn into the chamber.

4. An integrated pneumatically operated dispenser as defined in claim 3, wherein the distance between the first position and the second position of the first piston is adjusted by placing a piston stop in between the first position and the second position.

5. An integrated pneumatically operated dispenser as defined in claim 1, wherein the treatment composition comprises a liquid, a suspension, an emulsion, or a solid.

6. An integrated pneumatically operated dispenser as defined in claim 1, wherein the injection device contains a lumen in communication with the chamber.

7. An integrated pneumatically operated dispenser as defined in claim 1, wherein the injection device pierces an object when extended for injecting the treatment composition into the object.

8. An integrated pneumatically operated dispenser as defined in claim 7, wherein the object comprises an egg.

9. An integrated pneumatically operated dispenser as defined in claim 1, wherein the treatment composition comprises a vaccine, an antibody, or a vitamin composition.

10. An integrated pneumatically operated dispenser as defined in claim 1, wherein the chamber has a volume of from about 1 microliter to about 500 microliters, the volume of the chamber corresponding to the amount of the treatment composition that is drawn into the dispenser.

11. An integrated pneumatically operated dispenser as defined in claim 1, wherein the chamber has a volume of from about 1 microliter to about 100 microliters, the volume of the chamber corresponding to the amount of the treatment composition that is drawn into the dispenser.

12. An integrated pneumatically operated dispenser as defined in claim 1, further comprising a sensor portion, the sensor portion detecting the presence of an object that is to receive the treatment composition and inhibiting the first piston from dispensing the treatment composition if an object is not present.

13. An integrated pneumatically operated dispenser as defined in claim 12, wherein the sensor portion comprises an object contact responsive pneumatic valve.

14. An integrated pneumatically operated dispenser as defined in claim 1, further comprising a locator head surrounding the injection device, the locator head contacting an object to be injected with the treatment composition when the dispenser is lowered onto an object.

15. An integrated pneumatically operated dispenser as defined in claim 14, further comprising a sensor that prevents gas flow from the second gas inlet to the first piston when the dispenser is lowered and the locator head fails to contact an object.

16. An integrated pneumatically operated dispenser as defined in claim 15, wherein the dispenser is releasably held by a plate.

17. An integrated pneumatically operated dispenser as defined in claim 16, wherein, during injection of the treatment composition into an object, the dispenser is lowered relative to the plate, the sensor comprising a foot that contacts the plate when an object is not present below the locator head, the locator head maintaining the foot above the plate when an object is present.

18. An integrated pneumatically operated dispenser comprising:
    a fluid supply in communication with a treatment composition;
    a dispensing portion in communication with the fluid supply for dispensing selected amounts of the treatment composition from the fluid supply into an injection device, the dispensing portion comprising a pneumatic actuator in communication with a pressurized gas source, wherein, when the pressurized gas source supplies a pressurized gas to the pneumatic actuator, the pneumatic actuator dispenses the selected amount of the treatment composition into the injection device;
    a locator head surrounding the injection device for locating and contacting an object to be injected with the treatment composition when the dispenser is moved toward an object; and
    a sensor portion in communication with the dispensing portion, wherein, if the locator head fails to contact an object when the dispenser is moved, the sensor portion prevents gas flow to the pneumatic actuator for preventing the treatment composition from being dispensed.

19. An integrated pneumatically operated dispenser as defined in claim 18, wherein the pneumatic actuator comprises a first piston that moves between a first position and a second position and wherein movement from the first position to the second position causes a selected amount of the treatment composition from the fluid supply to be drawn into a chamber within the dispenser and movement of the first piston from the second position to the first position causes the selected amount of the treatment composition to be forced out of the chamber into the injection device.

20. An integrated pneumatically operated dispenser as defined in claim 19, further comprising a second piston connected to the injection device, the second piston moving between a first position where the injection device is retracted and a second position where the injection device is extended.

21. An integrated pneumatically operated dispenser as defined in claim 20, wherein the first piston and the second piston are in communication with the pressurized gas source and wherein, when the pressurized gas source supplies a pressurized gas to the first and second pistons, the first piston moves from the second position to the first position and the second piston is forced towards the second position for dispensing the treatment composition while the injection device is extended.

22. An integrated pneumatically operated dispenser as defined in claim 21, wherein the first piston and the second piston are also in communication with a second pressurized gas source, wherein, when pressurized gas is fed to the first and second pistons by the second pressurized gas source, the first piston moves from the first position to the second position and the second piston is forced towards the first position where the injection device is retracted.

23. An integrated pneumatically operated dispenser as defined in claim 22, wherein the sensor portion prevents gas flow from the pressurized gas source to the first piston if the locator head fails to contact an object when the dispenser is moved.

24. An integrated pneumatically operated dispenser as defined in claim 19, wherein the sensor portion prevents gas flow from the pressurized gas source to the first piston if the locator head fails to contact an object when the dispenser is moved.

25. An integrated pneumatically operated dispenser as defined in claim 18, wherein the dispenser is releasably held by a plate.

26. An integrated pneumatically operated dispenser as defined in claim 25, wherein, during injection of the treatment composition into an object, the dispenser is moved relative to the plate, the sensor portion comprising a foot that contacts the plate when an object is not present when the locator head is moved, the locator head maintaining the foot out of contact with the plate when an object is present.

* * * * *